(12) United States Patent
Holmes et al.

(10) Patent No.: US 12,091,297 B2
(45) Date of Patent: *Sep. 17, 2024

(54) LEVELING SYSTEM FOR LIFT DEVICE

(71) Applicant: Oshkosh Corporation, Oshkosh, WI (US)

(72) Inventors: Jesse Holmes, Oshkosh, WI (US); Constantin B. Marinoiu, Oshkosh, WI (US); Stephen Z. Smith, Oshkosh, WI (US); Eric Hackenberg, Oshkosh, WI (US); Jihong Hao, Oshkosh, WI (US); Harish Sivasubramanian, Oshkosh, WI (US); Marcel Amsallen, Oshkosh, WI (US)

(73) Assignee: Oshkosh Corporation, Oshkosh, WI (US)

(*) Notice: Subject to any disclaimer, the term of this patent is extended or adjusted under 35 U.S.C. 154(b) by 0 days.

This patent is subject to a terminal disclaimer.

(21) Appl. No.: 18/100,640

(22) Filed: Jan. 24, 2023

(65) Prior Publication Data

US 2023/0159313 A1   May 25, 2023

Related U.S. Application Data

(63) Continuation of application No. 17/079,014, filed on Oct. 23, 2020, now Pat. No. 11,591,199, which is a (Continued)

(51) Int. Cl.
*B66F 13/00* (2006.01)
*B60G 17/0165* (2006.01)
(Continued)

(52) U.S. Cl.
CPC .......... *B66F 13/00* (2013.01); *B60G 17/0165* (2013.01); *B60K 7/0007* (2013.01);
(Continued)

(58) Field of Classification Search
CPC ...... B62D 7/142; B66F 11/044; B66F 11/046; B66F 17/006; B60K 7/0007
See application file for complete search history.

(56) References Cited

U.S. PATENT DOCUMENTS 3,724,585 A    4/1973  Conrad
4,241,803 A   12/1980  Lauber
(Continued)

FOREIGN PATENT DOCUMENTS

CN         1148362 A        4/1997
CN        201923829         8/2011
(Continued)

OTHER PUBLICATIONS

Office Action issued in connection with Japanese Appl. No. 2021-524204 dated Sep. 5, 2023.
(Continued)

*Primary Examiner* — Kevin Hurley
*Assistant Examiner* — Michael R Stabley
(74) *Attorney, Agent, or Firm* — Foley & Lardner LLP

(57) ABSTRACT

A chassis for a lift device includes a base, an arm coupled to the base and configured to support a tractive element, and a plate extending from the arm at an upward angle. The arm includes a steering actuator interface configured to support an end of a steering actuator for the tractive element. The plate is configured to extend past the steering actuator.

15 Claims, 27 Drawing Sheets

Related U.S. Application Data continuation of application No. 16/673,162, filed on Nov. 4, 2019, now Pat. No. 10,858,231.

(60) Provisional application No. 62/813,547, filed on Mar. 4, 2019, provisional application No. 62/813,550, filed on Mar. 4, 2019, provisional application No. 62/755,882, filed on Nov. 5, 2018.

(51) Int. Cl.
| | | |
|---|---|---|
| *B60K 7/00* | (2006.01) | |
| *B62D 7/14* | (2006.01) | |
| *B62D 21/18* | (2006.01) | |
| *B66F 9/075* | (2006.01) | |
| *B66F 11/04* | (2006.01) | |
| *B66F 17/00* | (2006.01) | |

(52) U.S. Cl.
CPC ............ *B62D 7/142* (2013.01); *B62D 21/18* (2013.01); *B66F 9/07586* (2013.01); *B66F 11/044* (2013.01); *B66F 11/046* (2013.01); *B66F 17/006* (2013.01); *B60G 2202/41* (2013.01); *B60G 2202/413* (2013.01); *B60G 2204/47* (2013.01); *B60G 2204/4702* (2013.01); *B60G 2204/62* (2013.01); *B60G 2204/81* (2013.01); *B60G 2204/8102* (2013.01); *B60G 2204/82* (2013.01); *B60G 2204/8304* (2013.01); *B60G 2400/204* (2013.01); *B60G 2400/25* (2013.01); *B60G 2500/30* (2013.01); *B60G 2600/182* (2013.01); *B60G 2600/21* (2013.01); *B60G 2800/914* (2013.01)

(56) References Cited

U.S. PATENT DOCUMENTS

| | | | |
|---|---|---|---|
| 4,265,326 A | 5/1981 | Lauber | |
| 4,266,627 A | 5/1981 | Lauber | |
| 4,958,584 A | 9/1990 | Williamson | |
| 4,977,971 A | 12/1990 | Crane, III et al. | |
| 5,137,101 A | 8/1992 | Schaeff | |
| 5,230,529 A | 7/1993 | Harvey-Bailey | |
| 5,231,583 A | 7/1993 | Lizell | |
| 5,562,066 A | 10/1996 | Gere et al. | |
| 5,639,119 A | 6/1997 | Plate et al. | |
| 5,813,697 A | 9/1998 | Bargenquast et al. | |
| 5,950,336 A * | 9/1999 | Liebl .......... | E01H 5/06 37/231 |
| 6,036,201 A | 3/2000 | Pond et al. | |
| 6,443,687 B1 | 9/2002 | Kaiser | |
| 6,477,455 B2 | 11/2002 | Panizzolo | |
| 6,827,176 B2 | 12/2004 | Bean et al. | |
| 8,123,235 B2 | 2/2012 | Monk et al. | |
| 8,204,650 B2 | 6/2012 | Kesselgruber et al. | |
| 8,839,901 B1 * | 9/2014 | Bradshaw .......... | B62D 25/2072 180/346 |
| 8,888,122 B2 | 11/2014 | Berry | |
| 9,387,881 B2 | 7/2016 | Smith et al. | |
| 9,434,412 B2 | 9/2016 | Clark et al. | |
| 9,776,846 B2 | 10/2017 | Ditty | |
| 9,890,024 B2 | 2/2018 | Hao et al. | |
| 10,221,055 B2 | 3/2019 | Hao et al. | |
| 10,399,834 B2 | 9/2019 | Artoni et al. | |
| 10,407,288 B2 | 9/2019 | Hao et al. | |
| 2004/0112661 A1 | 6/2004 | Royle | |
| 2004/0197181 A1 | 10/2004 | Clark | |
| 2007/0289171 A1 | 12/2007 | Way et al. | |
| 2008/0314556 A1 | 12/2008 | Zhou et al. | |
| 2008/0314656 A1 | 12/2008 | Brehob et al. | |
| 2010/0019060 A1 | 1/2010 | Bittner | |
| 2011/0042164 A1 | 2/2011 | Clark et al. | |
| 2013/0020775 A1 | 1/2013 | Beji | |
| 2013/0220110 A1 | 8/2013 | Zhan et al. | |
| 2015/0165856 A1 | 6/2015 | Horstman | |
| 2016/0076263 A1 | 3/2016 | Tebeek et al. | |
| 2016/0200164 A1 | 7/2016 | Tabata et al. | |
| 2017/0203628 A1 | 7/2017 | Dames et al. | |
| 2017/0217745 A1 | 8/2017 | Artoni et al. | |
| 2017/0291802 A1 | 10/2017 | Hao et al. | |
| 2017/0291805 A1 | 10/2017 | Hao et al. | |
| 2018/0170322 A1 | 6/2018 | Gallione | |
| 2018/0333987 A1 | 11/2018 | Ratcliffe | |
| 2019/0039430 A1 | 2/2019 | Crook | |
| 2019/0185301 A1 | 6/2019 | Hao et al. | |
| 2019/0352157 A1 | 11/2019 | Hao et al. | |

FOREIGN PATENT DOCUMENTS

| | | |
|---|---|---|
| CN | 102633214 | 8/2012 |
| CN | 102791507 A | 11/2012 |
| CN | 103097216 A | 5/2013 |
| CN | 202912647 | 5/2013 |
| CN | 103261536 A | 8/2013 |
| CN | 104011401 A | 8/2014 |
| CN | 104011402 A | 8/2014 |
| CN | 204211441 | 3/2015 |
| CN | 104692303 A | 6/2015 |
| CN | 105229312 A | 1/2016 |
| CN | 106185747 | 12/2016 |
| CN | 108278229 A | 7/2018 |
| CN | 109795966 | 5/2019 |
| EP | 2 374 635 A1 | 10/2011 |
| EP | 2 711 329 | 3/2014 |
| JP | S63-011483 U | 1/1988 |
| JP | 2001-047834 A | 2/2001 |
| JP | 2002-079817 A | 3/2002 |
| JP | 2002-080186 A | 3/2002 |
| NL | 1017727 C2 | 10/2002 |
| WO | WO-89/00928 | 2/1989 |
| WO | WO-2017/217745 A1 | 12/2017 |
| WO | WO-2018/162882 | 9/2018 |

OTHER PUBLICATIONS

Office Action issued in connection with Japanese Appl. No. 2021-524206 dated Aug. 29, 2023.

* cited by examiner

LEVELING SYSTEM FOR LIFT DEVICE

CROSS-REFERENCE TO RELATED PATENT APPLICATIONS

This application is a continuation of U.S. patent application Ser. No. 17/079,014, filed Oct. 23, 2020, which is a continuation of U.S. patent application Ser. No. 16/673,162, filed Nov. 4, 2019, which claims the benefit of and priority to (a) U.S. Provisional Patent Application No. 62/755,882, filed Nov. 5, 2018, (b) U.S. Provisional Patent Application No. 62/813,547, filed Mar. 4, 2019, and (c) U.S. Provisional Patent Application No. 62/813,550, filed Mar. 4, 2019, all of which are incorporated herein by reference in their entireties.

BACKGROUND

Traditional boom lifts may include a chassis, a turntable coupled to the chassis, and a boom assembly. The boom assembly may include one or more boom sections that are pivotally connected to the turntable. A lift cylinder elevates the one or more boom sections relative to the turntable, thereby elevating an implement (e.g., work platform, forks, etc.) that is coupled to the boom assembly.

SUMMARY

One embodiment relates to a chassis for a lift device. The chassis includes a base, an arm coupled to the base and configured to support a tractive element, and a plate extending from the arm at an upward angle. The arm includes a steering actuator interface configured to support an end of a steering actuator for the tractive element. The plate is configured to extend past the steering actuator.

Another embodiment relates to a chassis for a lift device. The chassis include a base and an arm. The arm has a first end coupled to the base and a second end configured to support a tractive element. A portion of a bottom surface of the arm proximate the second end is angled upward.

Still another embodiment relates to a chassis for a lift device. The chassis includes a base. The base defines an interior chamber and an aperture that facilitates passing at least one of hosing or wiring through a wall of the base into the interior chamber. The base has a tab positioned proximate the aperture and that extends from the wall. The tab facilitates securing the at least one of the hosing or the wiring thereto using a retainer.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Figure 1:
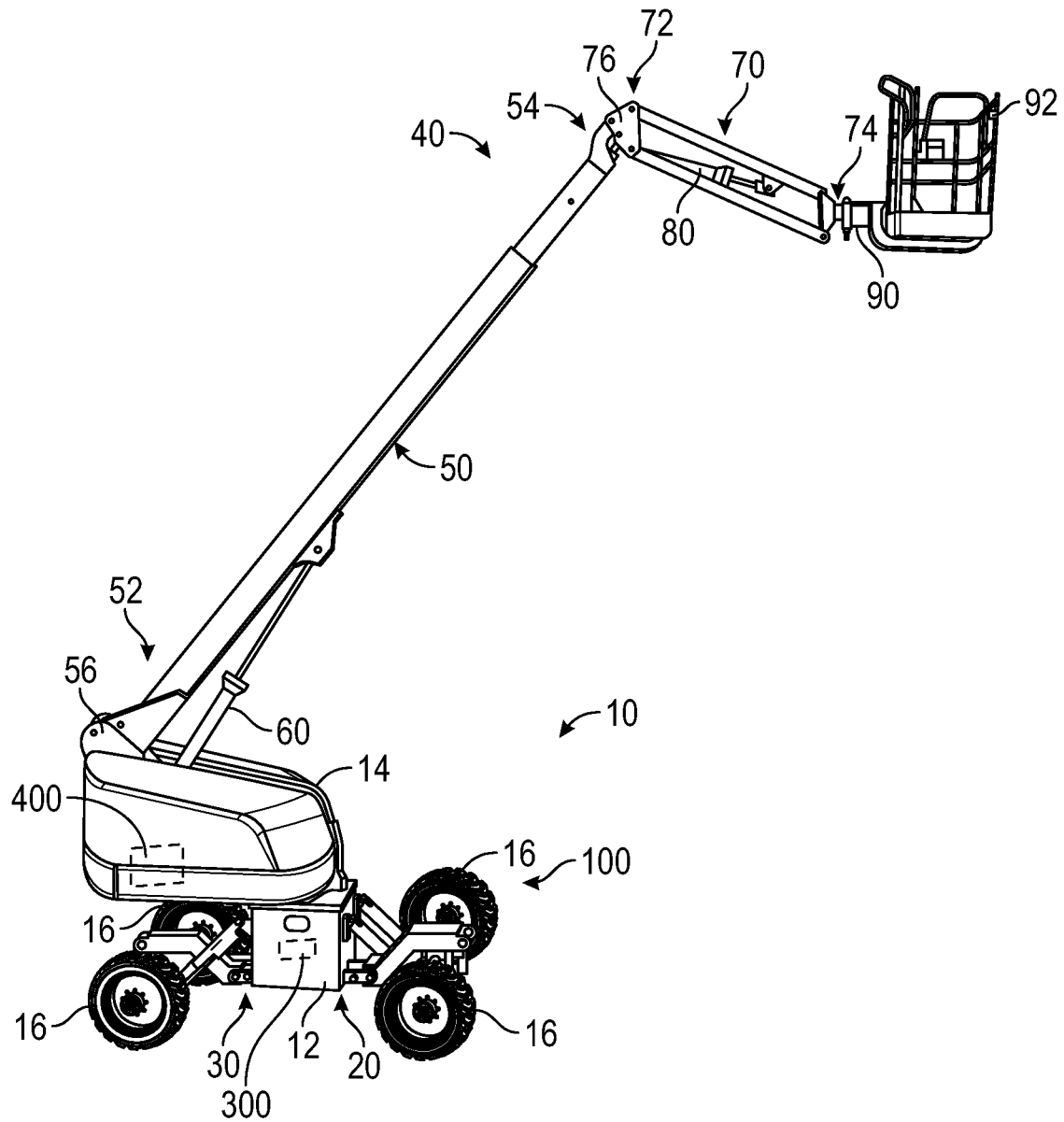
FIG. 1 is a perspective view of a lift device having a chassis, a leveling system, a turntable, and a boom, according to an exemplary embodiment.

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, a lift device includes a chassis, a leveling system, and a plurality of tractive elements coupled to the chassis by the leveling system. The leveling system is configured to maintain the chassis of the lift device level relative to gravity (e.g., flat, horizontal, etc.) while stationary and/or while moving (e.g., being driven, etc.). According to an exemplary embodiment, the leveling system includes a first leveling assembly, a second leveling assembly, a third leveling assembly, and a fourth leveling assembly. Each of the first leveling assembly, the second leveling assembly, the third leveling assembly, and the fourth leveling assembly includes (i) a respective trailing arm having a first end pivotally coupled to the chassis, (ii) a respective tractive element coupled to an opposing second end of the respective trailing arm, and (iii) a respective pivot actuator positioned to selectively pivot the trailing arm and the tractive element associated therewith relative to the chassis.

In some embodiments, the trailing arms are shaped to maximize the stroke of the pivot actuators. In some embodiments, the pivot actuators include a pressure assembly coupled to cylinders thereof that has a cover or cap that protects pressure sensors of the pressure assembly and/or the cylinders. In some embodiments, one or more of the trailing arms include a steering actuator coupled thereto and to the tractive element thereof. The trailing arms that have steering actuators may have a plate (e.g., an angled plate, etc.) extending therefrom and past the steering actuator thereof. In some embodiments, two of the trialing arms include steering actuators. In some embodiments, all of the trailing arms include steering actuators. In some embodiments, the chassis defines one or more ports that lead to an interior chamber of the chassis. The chassis may include one or more panels that selectively enclose the one or more ports. In some embodiments, the chassis includes one or more routing features that facilitate neatly and efficiently passing a plurality of hoses and/or wiring from the interior chamber through the chassis to the pivot actuators, the steering actuators, and/or drive actuators (e.g., that drive the tractive elements, etc.). In some embodiments, the lift device includes steering sensors positioned to monitor the steering angle of the tractive elements relative to a pivot axis between the tractive elements and the trailing arms.

According to an exemplary embodiment, the lift device is operable in a plurality of modes including one or more of a shipping, transport, or storage mode; a discrete braking mode; an adaptive oscillation mode; an auto level mode; or a high-speed drive mode. By way of example, the lift device may include a controller configured to operate the leveling system in the adaptive oscillation mode by selectively and adaptively fluidly coupling two of the pivot actuators of the first leveling assembly, the second leveling assembly, the third leveling assembly, and the fourth leveling assembly, while maintaining the other two of the pivot actuators fluidly decoupled. The two fluidly decoupled actuators may be independently and actively controlled by the controller.

The terms "front," "rear," "left," and "right" as used herein are relative terms to provide reference and not necessarily intended to be limiting. "Active control" refers to engaging valves, pumps, motors, etc. with a processing circuit or controller to selectively vary the extension, retraction, etc. of an actuator (e.g., a hydraulic cylinder, etc.) independently of other actuators. "Passive control" refers to actuator extension, retraction, etc. of an individual actuator that is permitted but not independently regulated using a processing circuit or controller. During such passive control, two actuators may be fluidly coupled such that the two actuators "freely float," however, fluid may be added or removed from the fluidly coupled actuators to increase or decrease the height of a "virtual pivot point" of the fluidly coupled actuators, as is described in more detail herein.

As shown in FIGS. 1-13, a lift device (e.g., an aerial work platform, a telehandler, a boom lift, a scissor lift, etc.), shown as lift device 10, includes a chassis, shown as lift base 12. In other embodiments, the lift device 10 is another type of vehicle (e.g., a fire apparatus, a military vehicle, a fire apparatus, an airport rescue fire fighting ("ARFF") truck, a boom truck, a refuse vehicle, a fork lift, etc.). As shown in FIG. 1, the lift base 12 supports a rotatable structure, shown as turntable 14, and a boom assembly, shown as boom 40. According to an exemplary embodiment, the turntable 14 is rotatable relative to the lift base 12. In one embodiment, the turntable 14 includes a counterweight positioned at a rear of the turntable 14. In other embodiments, the counterweight is otherwise positioned and/or at least a portion of the weight thereof is otherwise distributed throughout the lift device 10 (e.g., on the lift base 12, on a portion of the boom 40, etc.).

As shown in FIGS. 1-13, a first end, shown as front end 20, and an opposing second end, shown as rear end 30, of the lift base 12 is supported by a plurality of tractive elements, shown as tractive elements 16. According to the exemplary embodiment shown in FIGS. 1-13, the tractive elements 16 include wheels. In other embodiments, the tractive elements 16 include track elements. As shown in FIGS. 2, 3, 6, and 11-15, the lift device 10 includes a plurality of drivers, shown as drive actuators 18. According to an exemplary embodiment, each of the drive actuators 18 is positioned to facilitate independently and selectively driving one of the tractive elements 16 to move the lift device 10. As shown in FIGS. 3, 6, and 11, the lift device 10 only includes drive actuators 18 positioned to drive the front tractive elements 16. As shown in FIGS. 12 and 13, the lift device 10 includes drive actuators 18 positioned to drive the front tractive elements 16 and the rear tractive elements 16. In some embodiments, the lift device 10 includes a plurality of brakes (e.g., one for each tractive element 16, brakes 46, etc.) positioned to independently and selectively restrict rotation of each of the tractive elements 16.

As shown in FIG. 1, the boom 40 includes a first boom section, shown as lower boom 50, and a second boom section, shown as upper boom 70. In other embodiments, the boom 40 includes a different number and/or arrangement of boom sections (e.g., one, three, etc.). According to an exemplary embodiment, the boom 40 is an articulating boom assembly. In one embodiment, the upper boom 70 is shorter in length than the lower boom 50. In other embodiments, the upper boom 70 is longer in length than the lower boom 50. According to another exemplary embodiment, the boom 40 is a telescopic, articulating boom assembly. By way of example, the lower boom 50 and/or the upper boom 70 may include a plurality of telescoping boom sections that are configured to extend and retract along a longitudinal centerline thereof to selectively increase and decrease a length of the boom 40.

As shown in FIG. 1, the lower boom 50 has a first end (e.g., a lower end, etc.), shown as base end 52, and an opposing second end, shown as intermediate end 54. The base end 52 of the lower boom 50 is pivotally coupled (e.g., pinned, etc.) to the turntable 14 at a joint, shown as lower boom pivot 56. As shown in FIG. 1, the boom 40 includes a first actuator (e.g., pneumatic cylinder, electric actuator, hydraulic cylinder, etc.), shown as lower lift cylinder 60. The lower lift cylinder 60 has a first end coupled to the turntable 14 and an opposing second end coupled to the lower boom 50. According to an exemplary embodiment, the lower lift cylinder 60 is positioned to raise and lower the lower boom 50 relative to the turntable 14 about the lower boom pivot 56.

As shown in FIG. 1, the upper boom 70 has a first end, shown as intermediate end 72, and an opposing second end, shown as implement end 74. The intermediate end 72 of the upper boom 70 is pivotally coupled (e.g., pinned, etc.) to the intermediate end 54 of the lower boom 50 at a joint, shown as upper boom pivot 76. As shown in FIG. 1, the boom 40 includes an implement, shown as platform assembly 92, coupled to the implement end 74 of the upper boom 70 with an extension arm, shown as jib arm 90. In some embodiments, the jib arm 90 is configured to facilitate pivoting the platform assembly 92 about a lateral axis (e.g., pivot the platform assembly 92 up and down, etc.). In some embodiments, the jib arm 90 is configured to facilitate pivoting the platform assembly 92 about a vertical axis (e.g., pivot the platform assembly 92 left and right, etc.). In some embodiments, the jib arm 90 is configured to facilitate extending and retracting the platform assembly 92 relative to the implement end 74 of the upper boom 70. As shown in FIG. 1, the boom 40 includes a second actuator (e.g., pneumatic cylinder, electric actuator, hydraulic cylinder, etc.), shown as upper lift cylinder 80. According to an exemplary embodiment, the upper lift cylinder 80 is positioned to actuate (e.g., lift, rotate, elevate, etc.) the upper boom 70 and the platform assembly 92 relative to the lower boom 50 about the upper boom pivot 76.

According to an exemplary embodiment, the platform assembly 92 is a structure that is particularly configured to support one or more workers. In some embodiments, the platform assembly 92 includes an accessory or tool configured for use by a worker. Such tools may include pneumatic tools (e.g., impact wrench, airbrush, nail gun, ratchet, etc.), plasma cutters, welders, spotlights, etc. In some embodiments, the platform assembly 92 includes a control panel to control operation of the lift device 10 (e.g., the turntable 14, the boom 40, etc.) from the platform assembly 92. In other embodiments, the platform assembly 92 includes or is replaced with an accessory and/or tool (e.g., forklift forks, etc.).

As shown in FIGS. 1-15, the lift device 10 includes a chassis leveling assembly, shown as leveling system 100. According to an exemplary embodiment, the leveling system 100 is configured to facilitate maintaining the lift base 12, the turntable 14, and/or the platform assembly 92 of the lift device 10 level relative to gravity (e.g., while stationary, while being driven on uneven and/or sloped ground, while operating the boom 40, etc.). As shown in FIGS. FIGS. 2-8 and 10-15, the leveling system 100 includes a first leveling assembly, shown as front right leveling assembly 110, pivotally coupled to a right side of the front end 20 of the lift base 12; a second leveling assembly, shown as front left leveling assembly 130, pivotally coupled to a left side of the front end 20 of the lift base 12; a third leveling assembly, shown as rear right leveling assembly 150, pivotally coupled to the right side of the rear end 30 of the lift base 12; and a fourth leveling assembly, shown as rear left leveling assembly 170, pivotally coupled to the left side of the rear end 30 of the lift base 12. According to an exemplary embodiment, the front right leveling assembly 110, the front left leveling assembly 130, the rear right leveling assembly 150, and the rear left leveling assembly 170 facilitate providing two degrees of movement (e.g., pitch and roll adjustment, etc.) of the front end 20 and the rear end 30 of the lift base 12.

Figure 9:
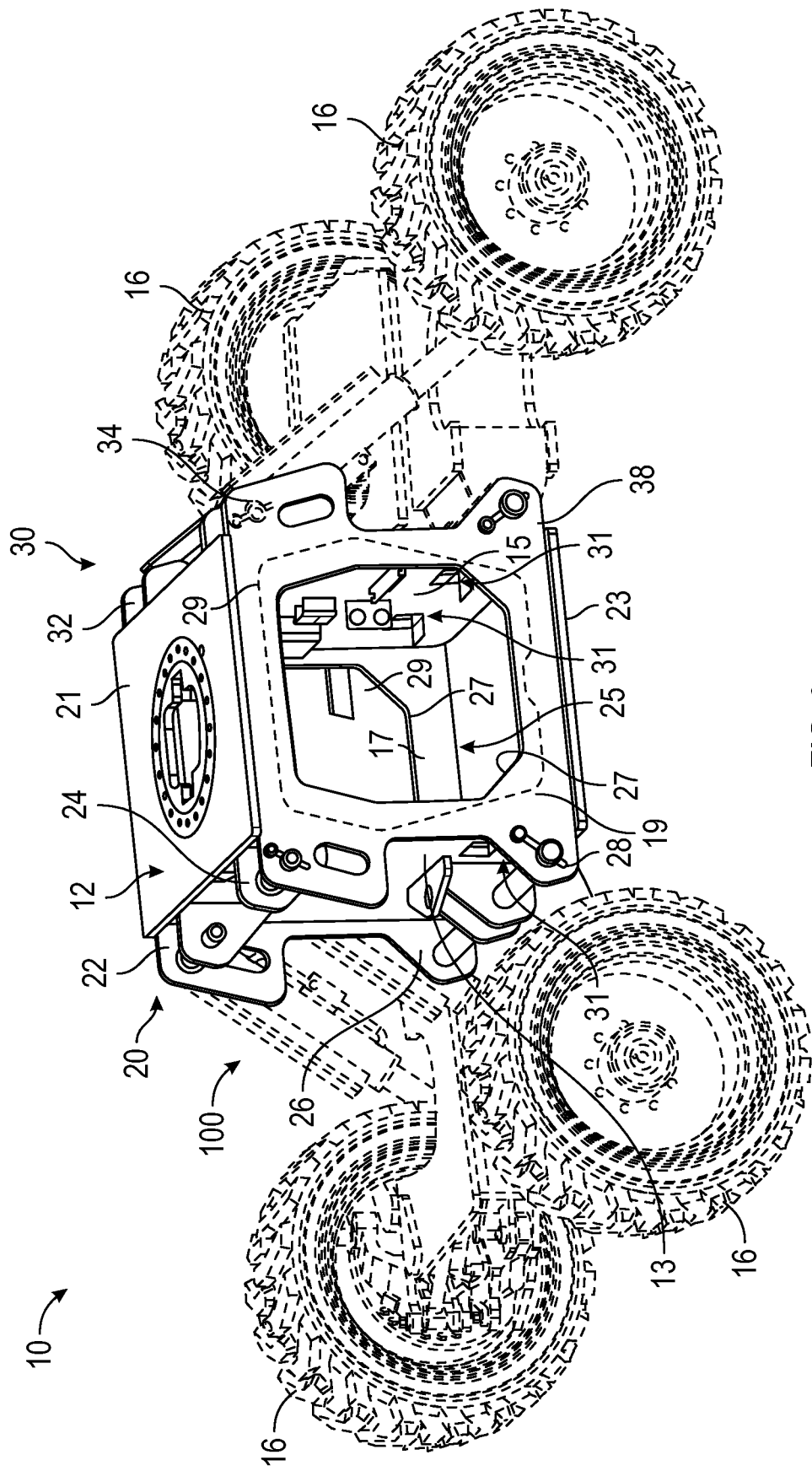
FIG. 9 is a side perspective view of the chassis and the leveling system of FIG. 8, according to an exemplary embodiment.
Figure 10:
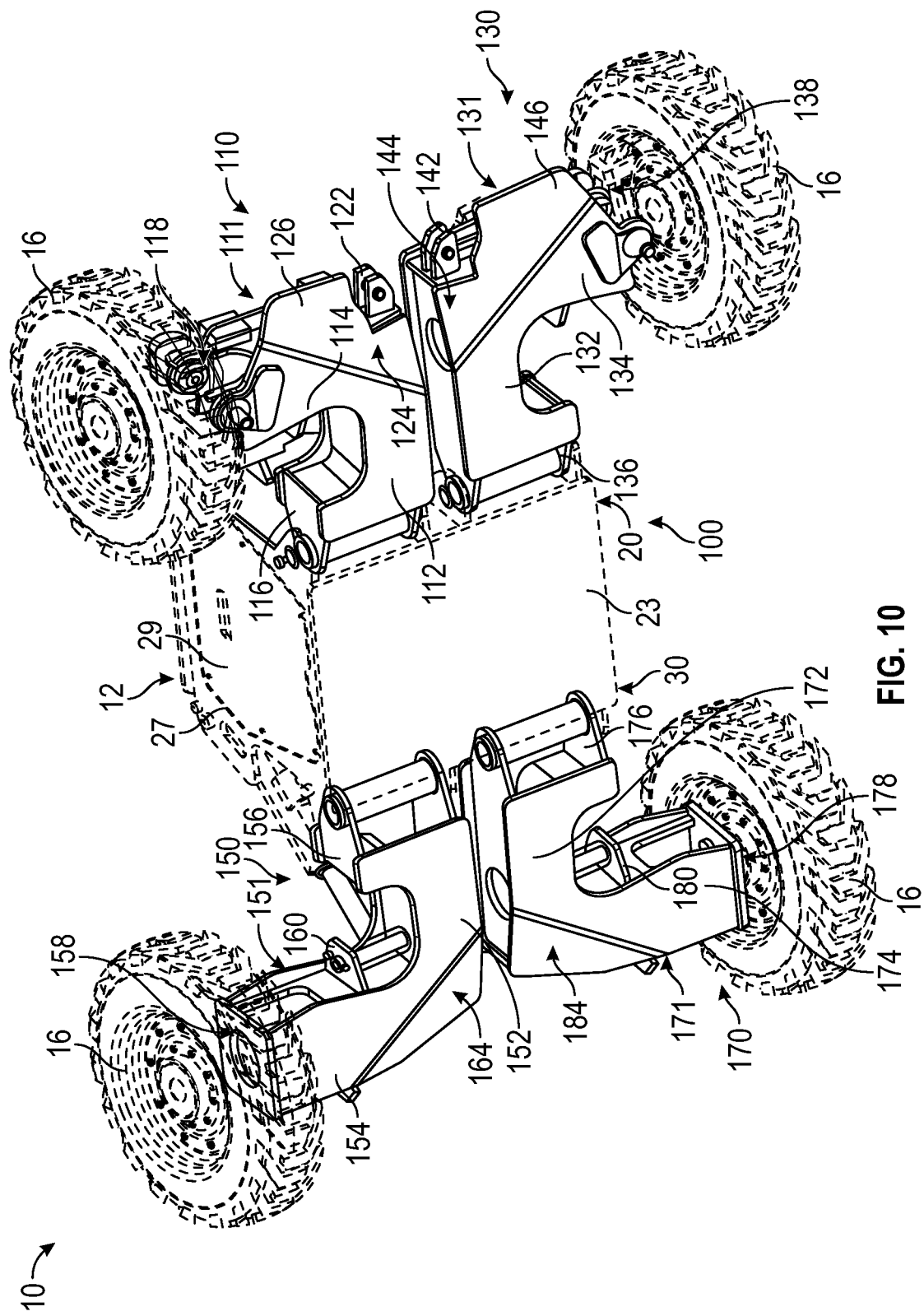
FIG. 10 is a bottom perspective view of the chassis and the leveling system of FIG. 8, according to an exemplary embodiment.
Figure 11:
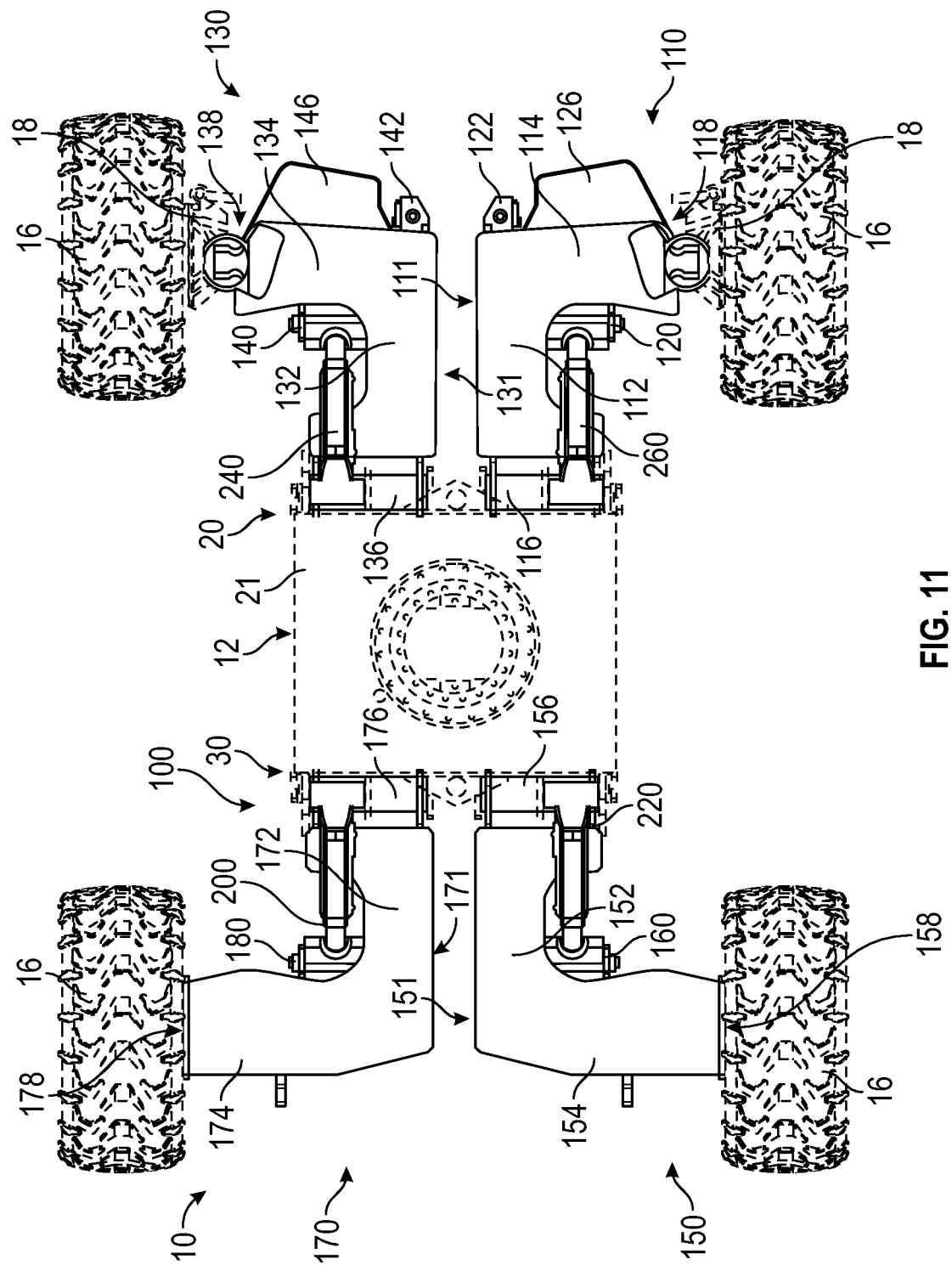
FIG. 11 is a top view of the chassis and the leveling system of FIG. 8, according to an exemplary embodiment.
Figure 12:
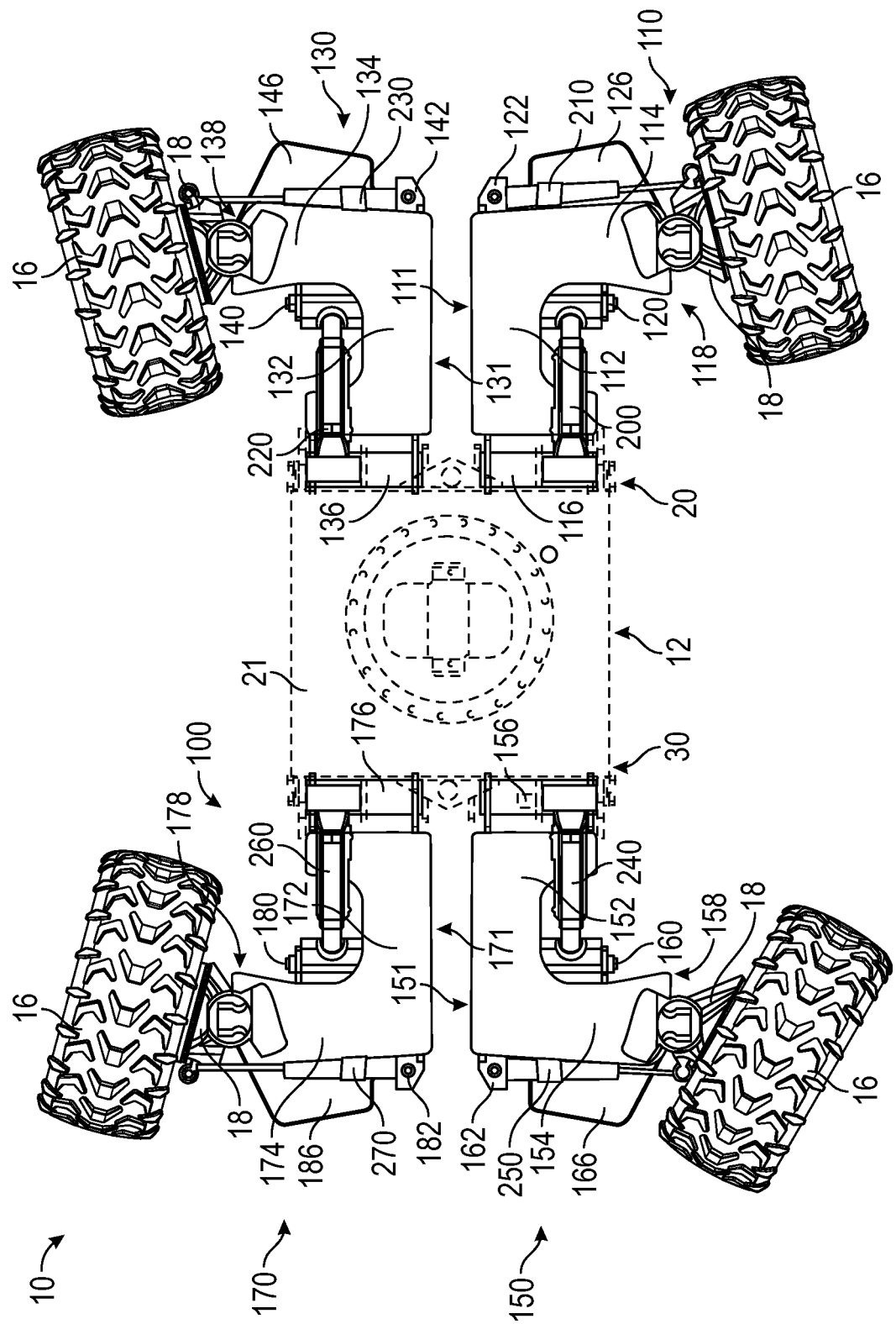
FIGS. 12 and 13 are various top views of the chassis and the leveling system of the lift device of FIG. 1, according to another exemplary embodiment.
Figure 13:
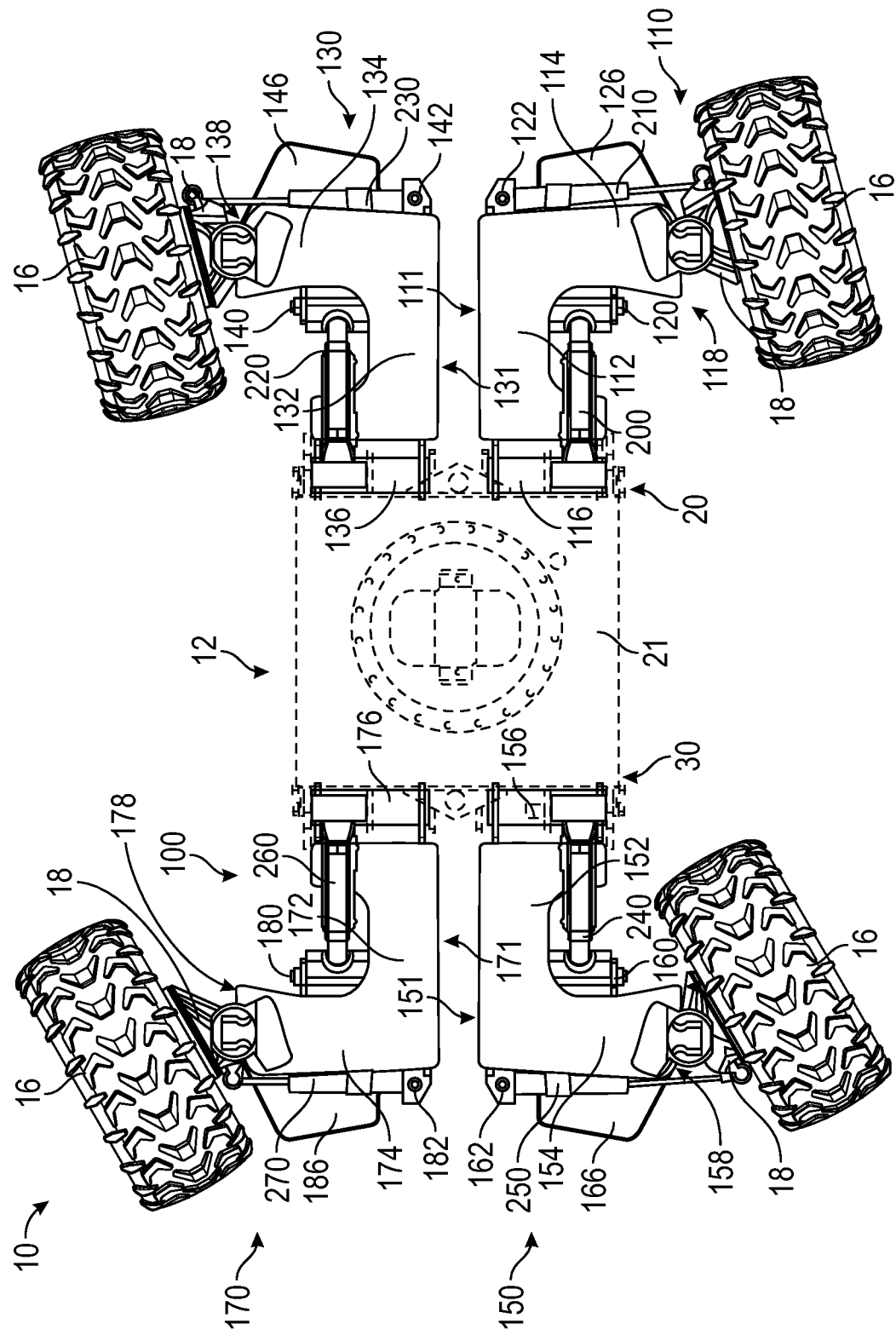
Figure 14:
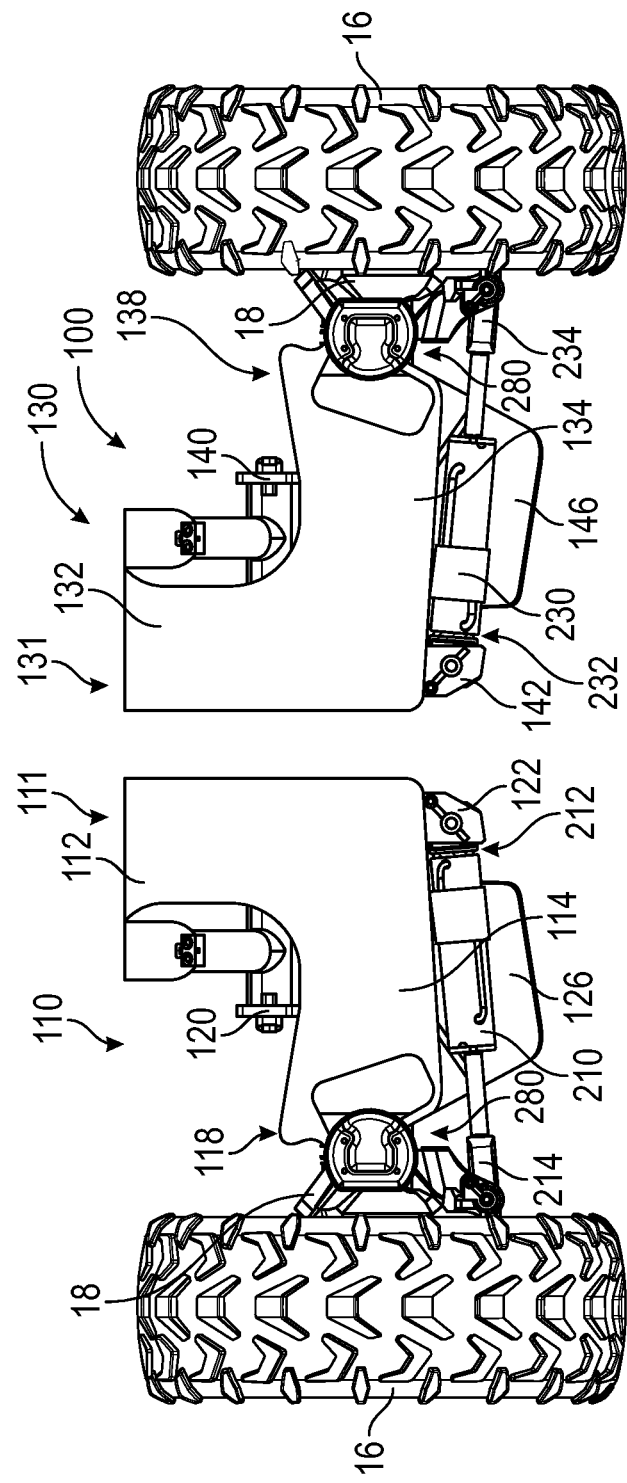
FIGS. 14-17 are various views of a steering system of the lift device of FIG. 1, according to an exemplary embodiment.
Figure 15:
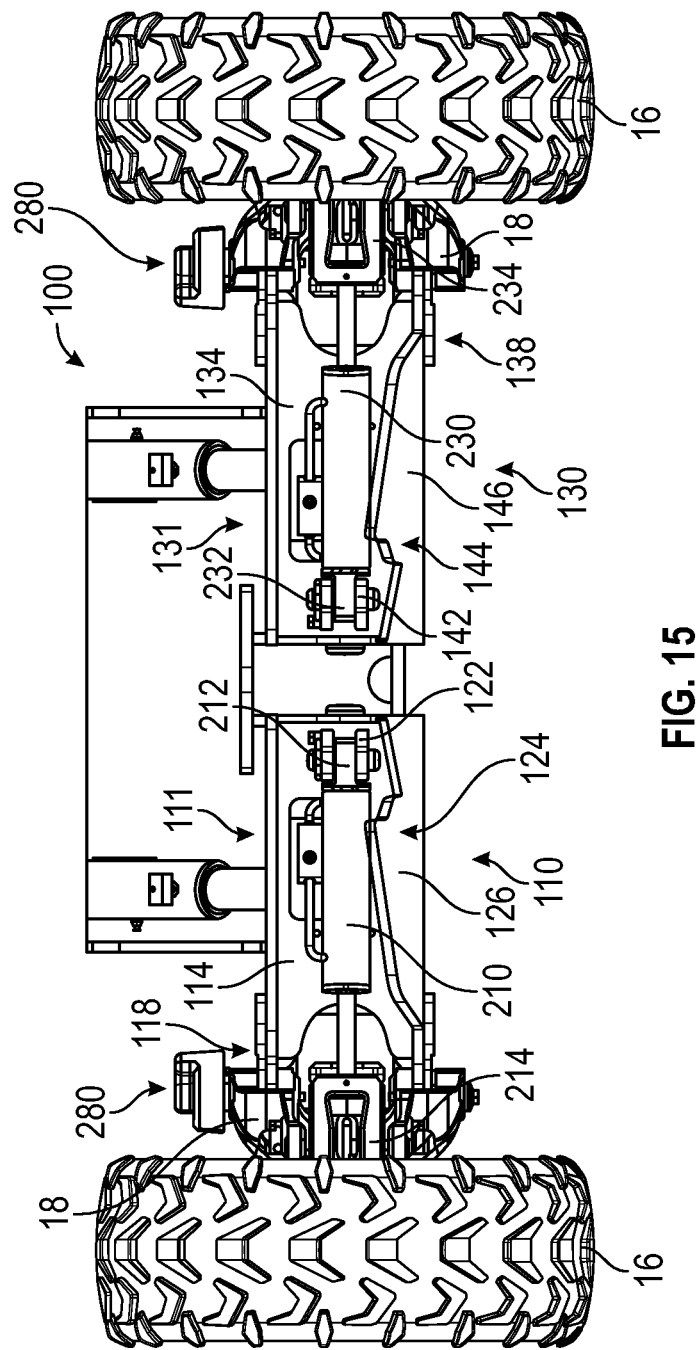
Figure 18:
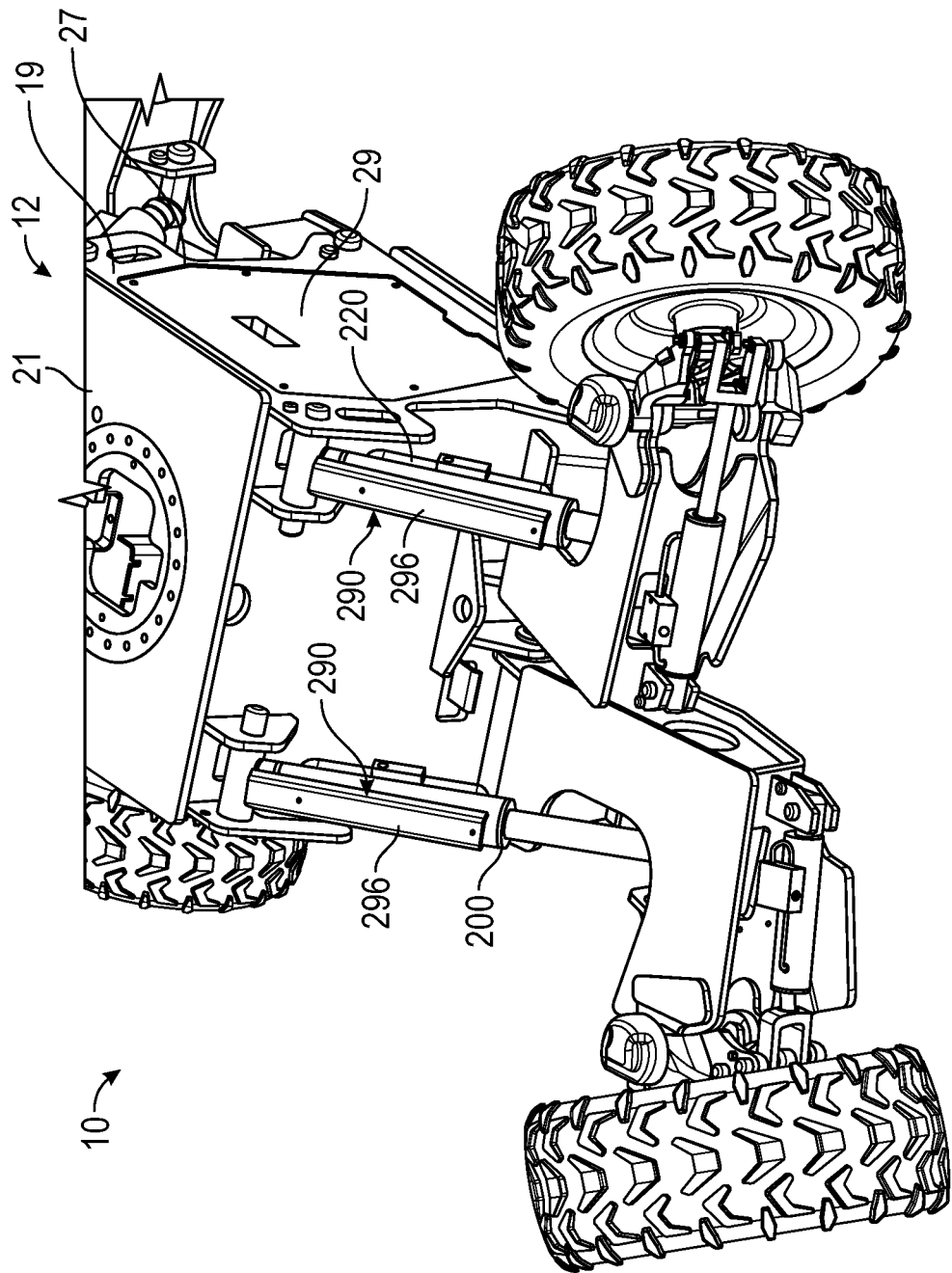
FIGS. 18-21 are various views of a pressure sensor assembly of the lift device of FIG. 1, according to an exemplary embodiment.
Figure 19:
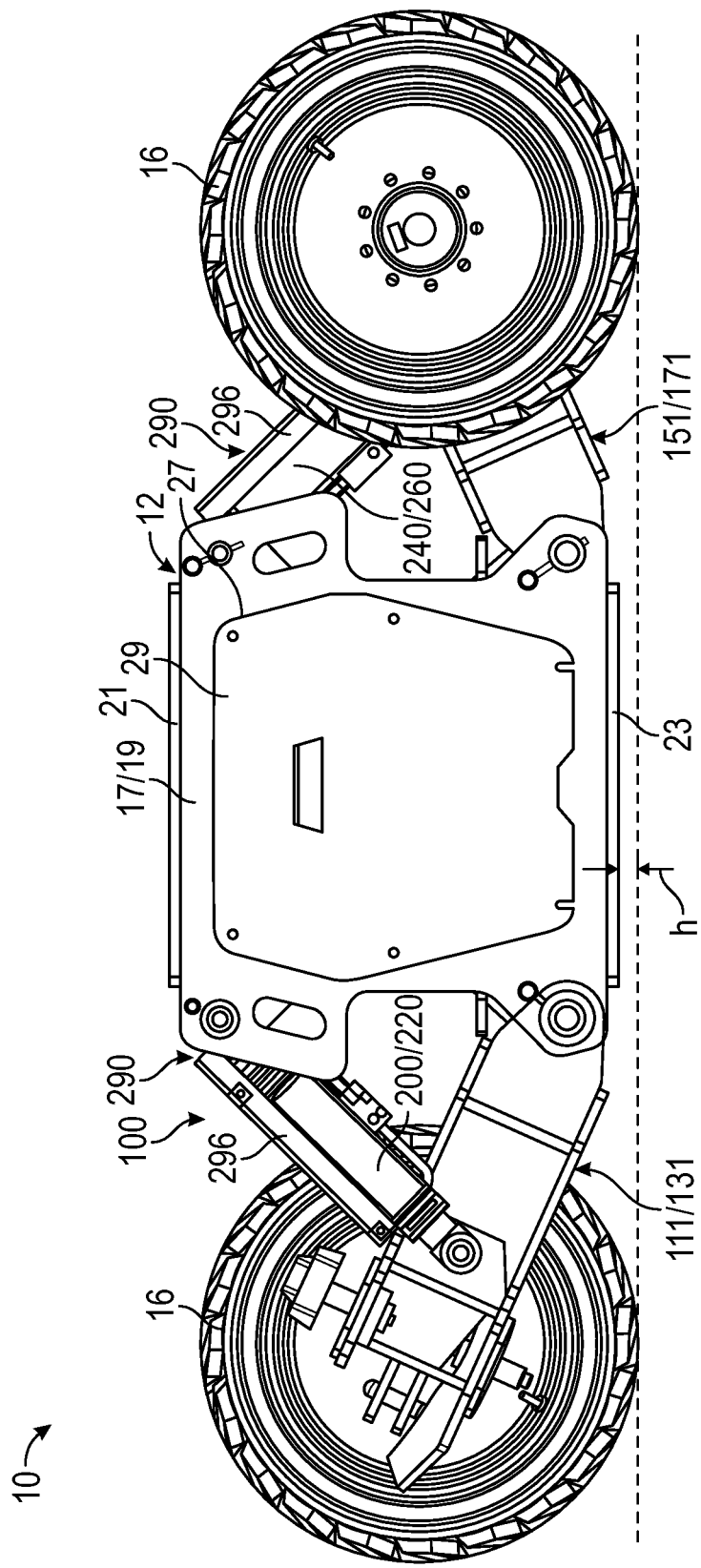
Figure 22:
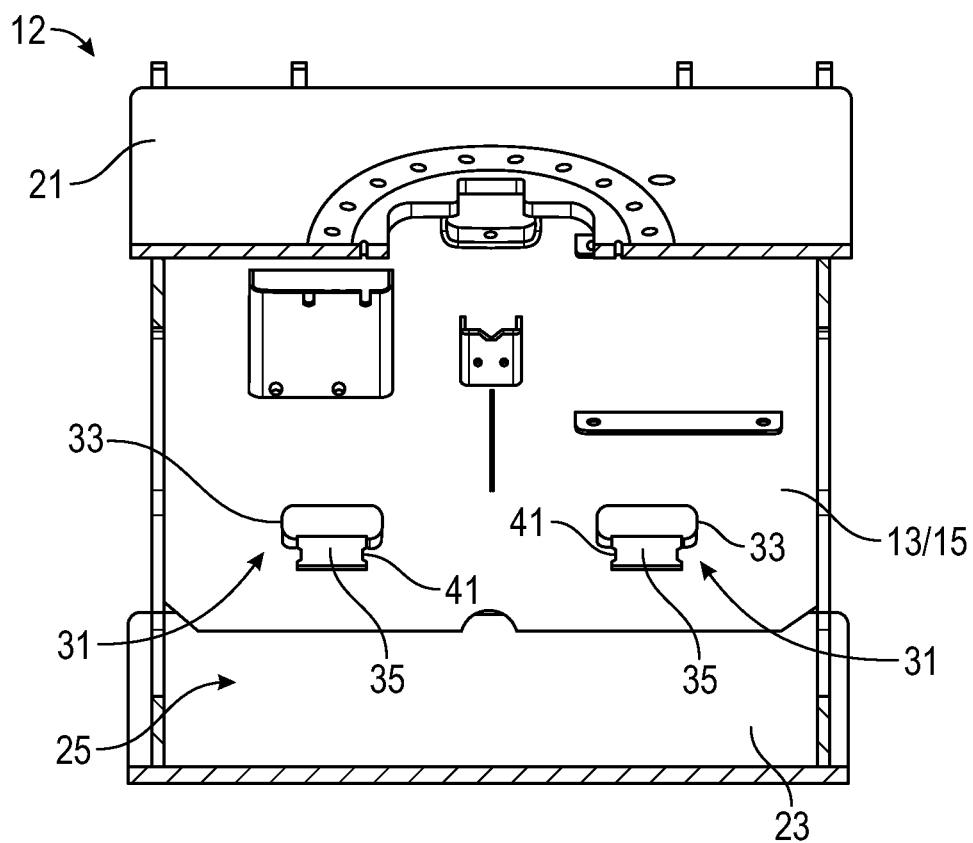
FIGS. 22-24 are various views of a routing feature of the chassis of the lift device of FIG. 1, according to an exemplary embodiment.

As shown in FIGS. 9-13, 18, 19, and 22, the lift base 12 includes a first plate, shown as front plate 13; a second plate, shown as rear plate 15, spaced from the front plate 13; a third plate shown as right side plate 17, extending between the front plate 13 and the rear plate 15 along the right edges thereof; a fourth plate, shown as left side plate 19, spaced from the right side plate 17 and extending between the front plate 13 and the rear plate 15 along the left edges thereof; a fifth plate, shown as top plate 21, extending between the top edges of the front plate 13, the rear plate 15, the right side plate 17, and the left side plate 19; and a sixth plate, shown as bottom plate 23, spaced from the top plate 21 and extending between the bottom edges of the front plate 13, the rear plate 15, the right side plate 17, and the left side plate 19. As shown in FIGS. 9 and 22, the front plate 13, the rear plate 15, the right side plate 17, the left side plate 19, the top plate 21, and the bottom plate 23 cooperatively define an internal cavity of the lift base 12, shown as interior chamber 25. As shown in FIGS. 9, 10, 18, and 19, the right side plate 17 and the left side plate 19 each define openings, shown as access ports 27, that provide selective access to components positioned within the interior chamber 25 (e.g., electronics, hydraulic circuitry, etc.) and facilitate easier assembly and service. In other embodiments, only one of the right side plate 17 or the left side plate 19 defines an access port 27. As shown in FIGS. 10, 18, and 19, the lift base 12 includes panels, shown as doors 29, that are detachably coupled to the right side plate 17 and the left side plate 19 to selectively enclose the access ports 27 and facilitate selectively accessing the interior chamber 25.

As shown in FIGS. 2-6 and 9, the lift base 12 includes a first coupler, shown as upper right pivot 22, coupled to the upper right portion of the front end 20 of the lift base 12; a second coupler, shown as upper left pivot 24, coupled to the upper left portion of the front end 20 of the lift base 12; a third coupler, shown as lower right pivot 26, coupled to the lower right portion of the front end 20 of the lift base 12; and a fourth coupler, shown as lower left pivot 28, coupled to the lower left portion of the front end 20 of the lift base 12. According to an exemplary embodiment, (i) the upper right pivot 22 and the lower right pivot 26 are at least partially formed by the right side plate 17, (ii) the upper left pivot 24 and the lower left pivot 28 are at least partially formed by the left side plate 19, and (iii) the upper right pivot 22, upper left pivot 24, the lower right pivot 26, and the lower left pivot 28 extend from the front plate 13. As shown in FIGS. 2-5, 7, and 9, the lift base 12 includes a fifth coupler, shown as upper right pivot 32, coupled to the upper right portion of the rear end 30 of the lift base 12; a sixth coupler, shown as upper left pivot 34, coupled to the upper left portion of the rear end 30 of the lift base 12; a seventh coupler, shown as lower right pivot 36, coupled to the lower right portion of the rear end 30 of the lift base 12; and an eighth coupler, shown as lower left pivot 38, coupled to the lower left portion of the rear end 30 of the lift base 12. According to an exemplary embodiment, (i) the upper right pivot 32 and the lower right pivot 36 are at least partially formed by the right side plate 17, (ii) the upper left pivot 34 and the lower left pivot 38 are at least partially formed by the left side plate 19, and (iii) the upper right pivot 32, upper left pivot 34, the lower right pivot 36, and the lower left pivot 38 extend from the rear plate 15.

As shown in FIGS. 2, 3, 5, 6, 8, and 10-15, the front right leveling assembly 110 includes a first arm, shown as front right trailing arm 111, having a first portion, shown as longitudinal member 112, and a second portion, shown as lateral member 114, extending from the longitudinal member 112. According to an exemplary embodiment, the lateral member 114 extends at an angle substantially perpendicular to the longitudinal member 112 (e.g., such that the front right trailing arm 111 is "L-shaped," etc.). In other embodiments, the lateral member 114 extends at an angle that is obtuse (e.g., greater than ninety degrees, etc.) to the longitudinal member 112. According to an exemplary embodiment, the longitudinal member 112 and the lateral member 114 are integrally formed or otherwise permanently coupled to each other (e.g., welded, etc.) such that the front right trailing arm 111 has a unitary structure. In other embodiments, the longitudinal member 112 and the lateral member 114 are fastened together (e.g., using bolts, etc.).

Figure 5:
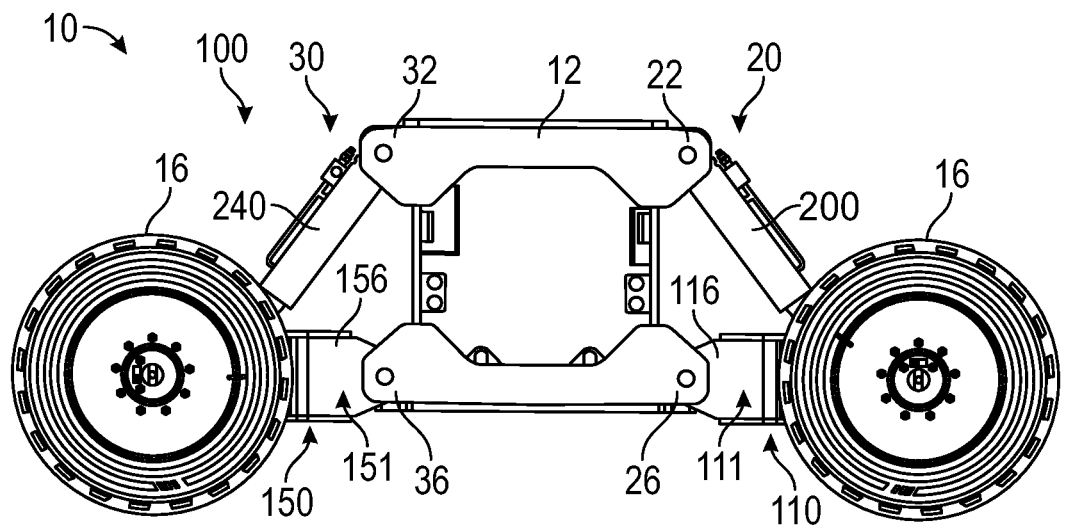
FIG. 5 is a second side view of the chassis and the leveling system of FIG. 2, according to an exemplary embodiment.
Figure 6:
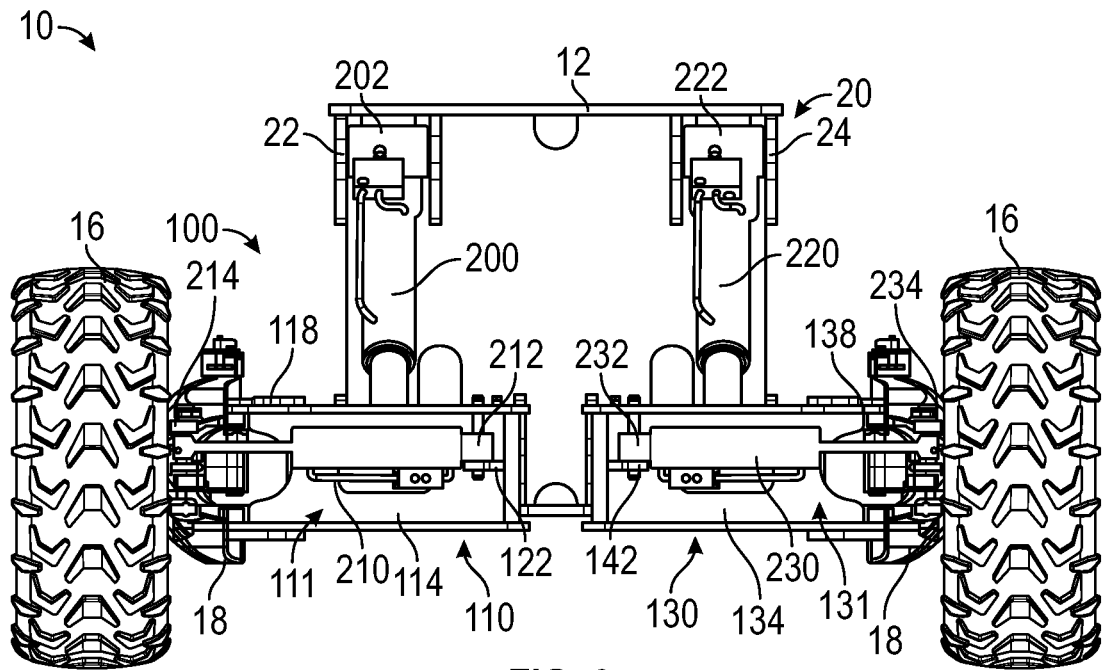
FIG. 6 is a front view of the chassis and the leveling system of FIG. 2, according to an exemplary embodiment.
Figure 7:
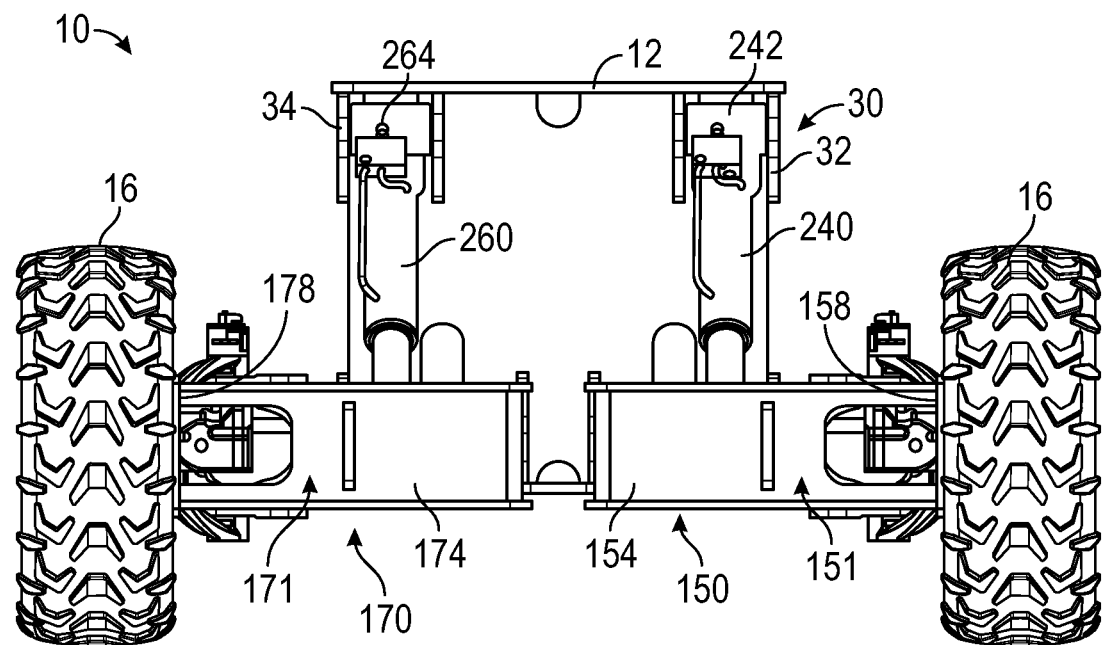
FIG. 7 is a rear view of the chassis and the leveling system of FIG. 2, according to an exemplary embodiment.
Figure 8:
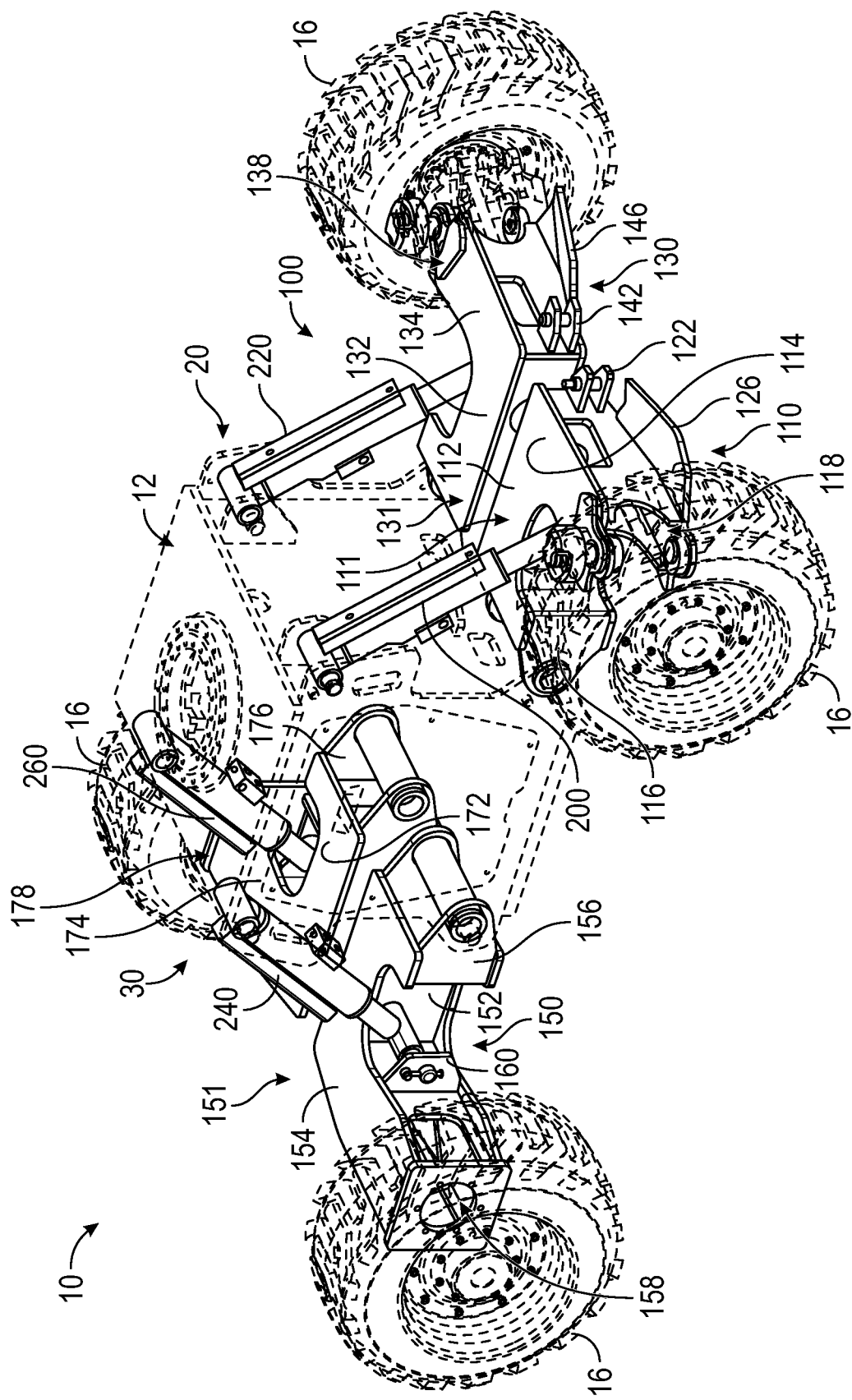
FIG. 8 is a front perspective view of the chassis and the leveling system of the lift device of FIG. 1, according to another exemplary embodiment.

As shown in FIGS. 2, 3, 5, 6, 8, and 10-15, the front right trailing arm 111 includes (i) a first coupler, shown as base coupler 116, positioned at a free end of the longitudinal member 112 and (ii) a second coupler, shown as tractive element coupler 118, positioned at a free end of the lateral member 114. As shown in FIG. 5, the base coupler 116 is configured to interface with the lower right pivot 26 to pivotally couple the front right trailing arm 111 to the front end 20 of the lift base 12. As shown in FIGS. 2, 3, 6, and 11-15, the tractive element coupler 118 is configured to interface with a respective one of the drive actuators 18 such that the respective one of the drive actuators 18 and the tractive element 16 corresponding therewith (e.g., coupled thereto, driven thereby, etc.) is pivotally coupled (e.g., pinned, about a vertical axis defined by the pivot point, etc.) to the lateral member 114 of the front right trailing arm 111.

As shown in FIGS. 2, 3, 6, 8, and 10-15, the front right trailing arm 111 includes (i) a third coupler, shown as leveling actuator coupler 120, positioned along an interior edge/surface of the front right trailing arm 111 proximate the interface between the longitudinal member 112 and the lateral member 114 and (ii) a fourth coupler, shown as steering actuator coupler 122, positioned along an exterior edge/surface of the lateral member 114 of the front right trailing arm 111. As shown in FIGS. 2, 3, 5, 6, 8, and 11-13, the front right leveling assembly 110 includes a first leveling actuator, shown as front right leveling actuator 200, having (i) a first end, shown as base end 202, pivotally coupled to the upper right pivot 22 of the lift base 12 and (ii) an opposing second end, shown as arm end 204, pivotally coupled to the leveling actuator coupler 120 of the front right trailing arm 111. According to an exemplary embodiment, the front right leveling actuator 200 is positioned to facilitate independently and selectively pivoting the front right trailing arm 111 relative to the front end 20 of the lift base 12 about the lower right pivot 26 (e.g., about a lateral axis defined thereby, etc.). According to an exemplary embodiment, the front right leveling actuator 200 is or includes a hydraulic cylinder. In other embodiments, the front right leveling actuator 200 is or includes another type of actuator (e.g., a pneumatic cylinder, an electric actuator, etc.).

As shown in FIGS. 2, 3, 6, and 12-15, the front right leveling assembly 110 includes a first steering actuator, shown as front right steering actuator 210, having (i) a first end, shown as first end 212, pivotally coupled to the steering actuator coupler 122 of the front right trailing arm 111 and (ii) an opposing second end, shown as second end 214, pivotally coupled to a respective one of the drive actuators 18 (e.g., a front right drive actuator, etc.). According to an exemplary embodiment, the front right steering actuator 210 is positioned to facilitate independently and selectively pivoting (i.e., steering) the respective one of the drive actuators 18 and the tractive element 16 corresponding therewith relative to the front right trailing arm 111 about the tractive element coupler 118 (e.g., about a vertical axis defined thereby, etc.). According to an exemplary embodiment, the front right steering actuator 210 is or includes a hydraulic cylinder. In other embodiments, the front right steering actuator 210 is or includes another type of actuator (e.g., a pneumatic cylinder, an electric actuator, etc.).

As shown in FIGS. 2-4, 6, 8, and 10-15, the front left leveling assembly 130 includes a second arm, shown as front left trailing arm 131, having a first portion, shown as longitudinal member 132, and a second portion, shown as lateral member 134, extending from the longitudinal member 132. According to an exemplary embodiment, the lateral member 134 extends at an angle substantially perpendicular to the longitudinal member 132 (e.g., such that the front left trailing arm 131 is "L-shaped," etc.). In other embodiments, the lateral member 134 extends at an angle that is obtuse (e.g., greater than ninety degrees, etc.) to the longitudinal member 132. According to an exemplary embodiment, the longitudinal member 132 and the lateral member 134 are integrally formed or otherwise permanently coupled to each other (e.g., welded, etc.) such that the front left trailing arm 131 has a unitary structure. In other embodiments, the longitudinal member 132 and the lateral member 134 are fastened together (e.g., using bolts, etc.).

Figure 2:
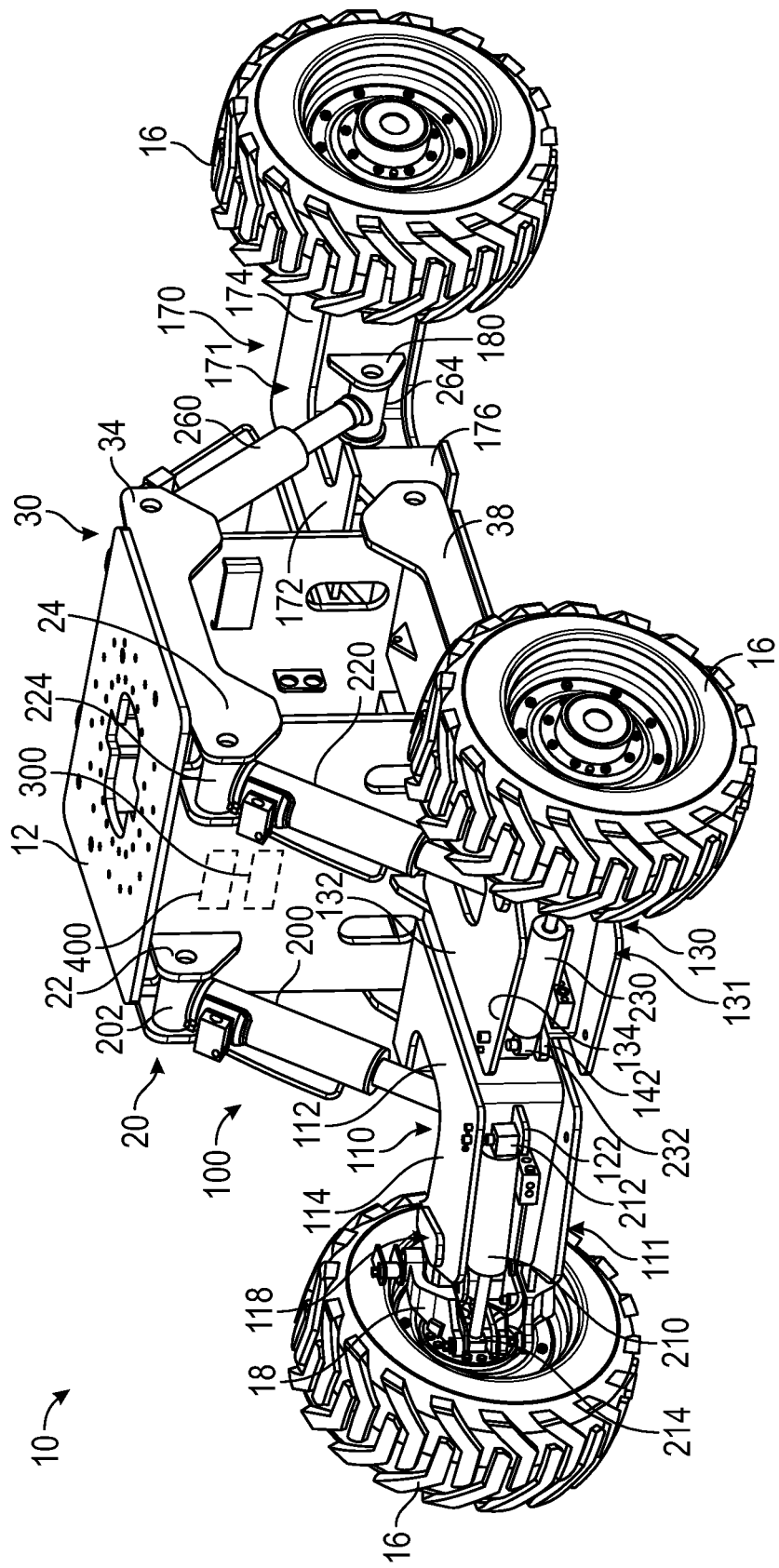
FIG. 2 is a front perspective view of the chassis and the leveling system of the lift device of FIG. 1, according to an exemplary embodiment.
Figure 3:
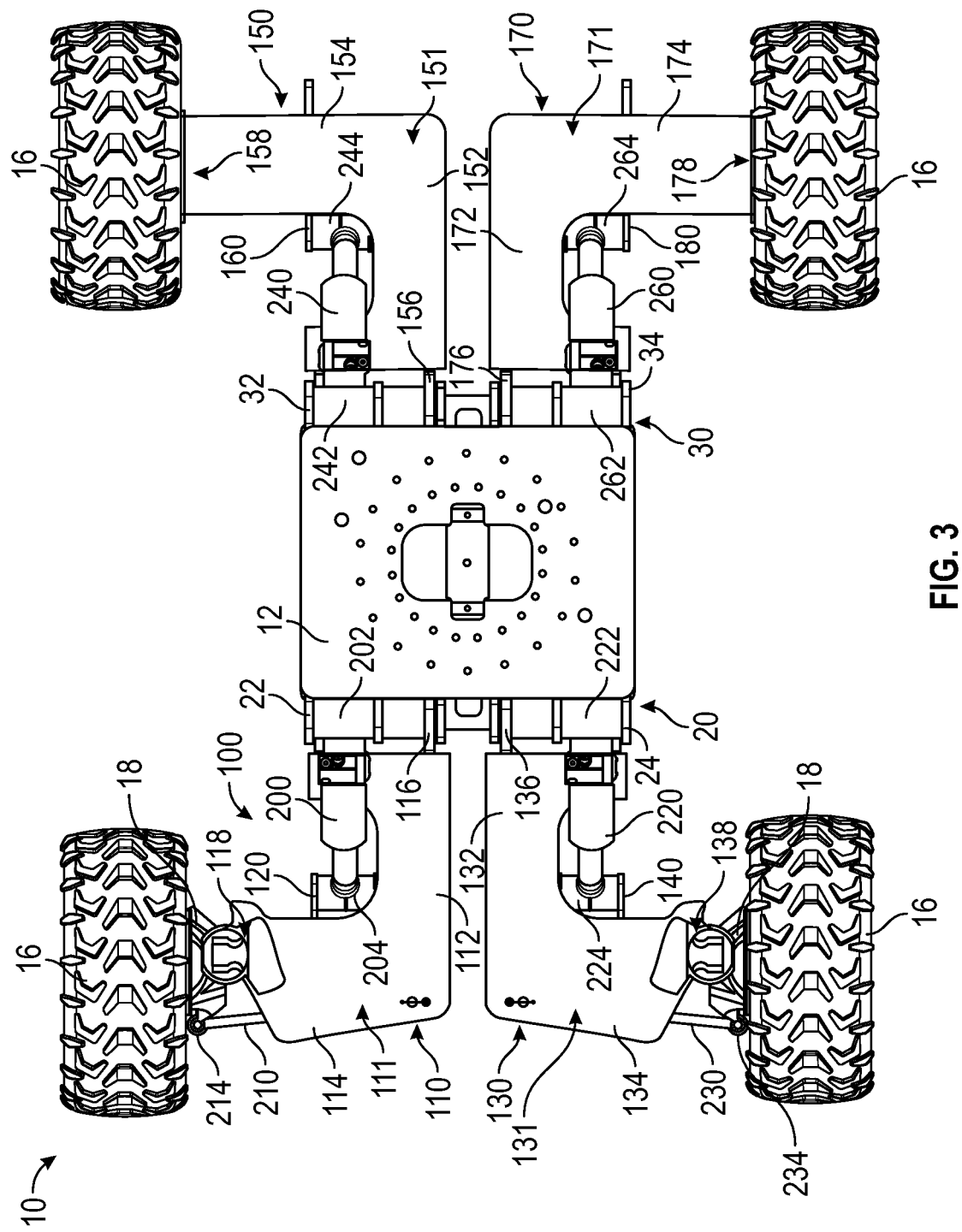
FIG. 3 is a top view of the chassis and the leveling system of FIG. 2, according to an exemplary embodiment.
Figure 4:
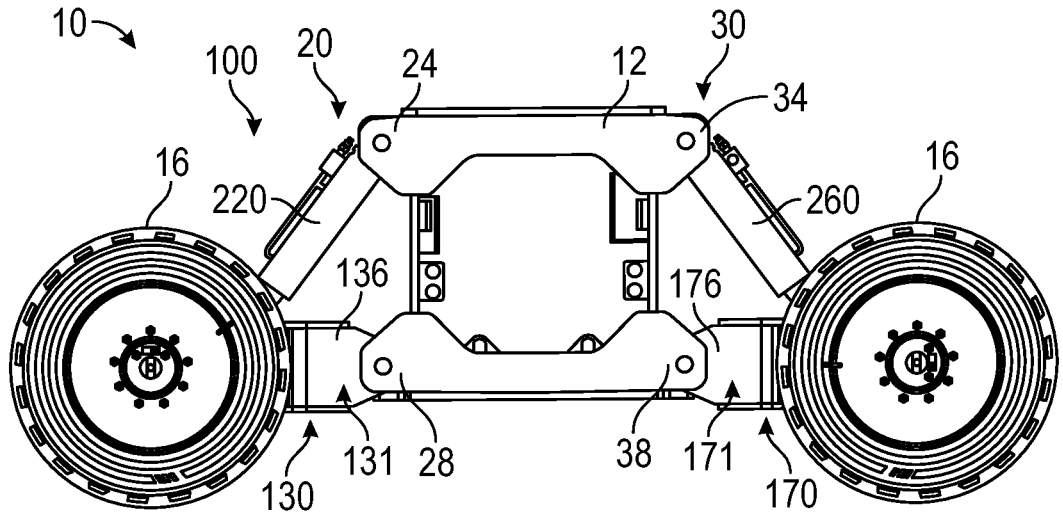
FIG. 4 is a first side view of the chassis and the leveling system of FIG. 2, according to an exemplary embodiment.

As shown in FIGS. 2-4, 6, 8, and 10-15, the front left trailing arm 131 includes (i) a first coupler, shown as base coupler 136, positioned at a free end of the longitudinal member 132 and (ii) a second coupler, shown as tractive element coupler 138, positioned at a free end of the lateral member 134. As shown in FIG. 4, the base coupler 136 is configured to interface with the lower left pivot 28 to pivotally couple the front left trailing arm 131 to the front end 20 of the lift base 12. As shown in FIGS. 3, 6, and 11-15, the tractive element coupler 138 is configured to interface with a respective one of the drive actuators 18 such that the respective one of the drive actuators 18 and the tractive element 16 corresponding therewith (e.g., coupled thereto, driven thereby, etc.) is pivotally coupled (e.g., pinned, about a vertical axis defined by the pivot point, etc.) to the lateral member 134 of the front left trailing arm 131.

As shown in FIGS. 2, 3, 6, 8, and 10-15, the front left trailing arm 131 includes (i) a third coupler, shown as leveling actuator coupler 140, positioned along an interior edge/surface of the front left trailing arm 131 proximate the interface between the longitudinal member 132 and the lateral member 134 and (ii) a fourth coupler, shown as steering actuator coupler 142, positioned along an exterior edge/surface of the lateral member 134 of the front left trailing arm 131. As shown in FIGS. 2-4, 6, 8, and 11-13, the front left leveling assembly 130 includes a second leveling actuator, shown as front left leveling actuator 220, having (i) a first end, shown as base end 222, pivotally coupled to the upper left pivot 24 of the lift base 12 and (ii) an opposing second end, shown as arm end 224, pivotally coupled to the leveling actuator coupler 140 of the front left trailing arm 131. According to an exemplary embodiment, the front left leveling actuator 220 is positioned to facilitate independently and selectively pivoting the front left trailing arm 131 relative to the front end 20 of the lift base 12 about the lower left pivot 28 (e.g., about a lateral axis defined thereby, etc.). According to an exemplary embodiment, the front left leveling actuator 220 is or includes a hydraulic cylinder. In other embodiments, the front left leveling actuator 220 is or includes another type of actuator (e.g., a pneumatic cylinder, an electric actuator, etc.).

As shown in FIGS. 2, 3, 6, and 12-15, the front left leveling assembly 130 includes a second steering actuator, shown as front left steering actuator 230, having (i) a first end, shown as first end 232, pivotally coupled to the steering actuator coupler 142 of the front left trailing arm 131 and (ii) an opposing second end, shown as second end 234, pivotally coupled to a respective one of the drive actuators 18 (e.g., a front left drive actuator, etc.). According to an exemplary embodiment, the front left steering actuator 230 is positioned to facilitate independently and selectively pivoting (i.e., steering) the respective one of the drive actuators 18 and the tractive element 16 corresponding therewith relative to the front left trailing arm 131 about the tractive element coupler 138 (e.g., about a vertical axis defined thereby, etc.). According to an exemplary embodiment, the front left steering actuator 230 is or includes a hydraulic cylinder. In other embodiments, the front left steering actuator 230 is or includes another type of actuator (e.g., a pneumatic cylinder, an electric actuator, etc.).

As shown in FIGS. 3, 5, 7, and 10-13, the rear right leveling assembly 150 includes a third arm, shown as rear right trailing arm 151, having a first portion, shown as longitudinal member 152, and a second portion, shown as lateral member 154, extending from the longitudinal member 152. According to an exemplary embodiment, the lateral member 154 extends at an angle substantially perpendicular to the longitudinal member 152 (e.g., such that the rear right trailing arm 151 is "L-shaped," etc.). In other embodiments, the lateral member 154 extends at an angle that is obtuse (e.g., greater than ninety degrees, etc.) to the longitudinal member 152. According to an exemplary embodiment, the longitudinal member 152 and the lateral member 154 are integrally formed or otherwise permanently coupled to each other (e.g., welded, etc.) such that the rear right trailing arm 151 has a unitary structure. In other embodiments, the longitudinal member 152 and the lateral member 154 are fastened together (e.g., using bolts, etc.).

As shown in FIGS. 3, 5, 7, 8, and 10-13, the rear right trailing arm 151 includes (i) a first coupler, shown as base coupler 156, positioned at a free end of the longitudinal member 152 and (ii) a second coupler, shown as tractive element coupler 158, positioned at a free end of the lateral member 154. As shown in FIG. 5, the base coupler 156 is configured to interface with the lower right pivot 36 to pivotally couple the rear right trailing arm 151 to the rear end 30 of the lift base 12. As shown in FIGS. 3, 7, 8, 10, and 11, the tractive element coupler 158 is configured to interface with a respective one of the tractive elements 16 (e.g., a rear right tractive element, etc.) such that the orientation of the respective one of the tractive elements 16 is fixed (e.g., non-steerable, etc.). As shown in FIGS. 12 and 13, the tractive element coupler 158 is alternatively configured to interface with a respective one of the drive actuators 18 such that the respective one of the drive actuators 18 and the tractive element 16 corresponding therewith (e.g., coupled thereto, driven thereby, etc.) is pivotally coupled (e.g., pinned, about a vertical axis defined by the pivot point, etc.) to the lateral member 154 of the rear right trailing arm 151.

As shown in FIGS. 3, 8, and 10-13, the rear right trailing arm 151 includes a third coupler, shown as leveling actuator coupler 160, positioned along an interior edge/surface of the rear right trailing arm 151 proximate the interface between the longitudinal member 152 and the lateral member 154. As shown in FIGS. 3, 5, 7, 8, and 11-13, the rear right leveling assembly 150 includes a third leveling actuator, shown as rear right leveling actuator 240, having (i) a first end, shown as base end 242, pivotally coupled to the upper right pivot 32 of the lift base 12 and (ii) an opposing second end, shown as arm end 244, pivotally coupled to the leveling actuator coupler 160 of the rear right trailing arm 151. According to an exemplary embodiment, the rear right leveling actuator 240 is positioned to facilitate independently and selectively pivoting the rear right trailing arm 151 relative to the rear end 30 of the lift base 12 about the lower right pivot 36 (e.g., about a lateral axis defined thereby, etc.). According to an exemplary embodiment, the rear right leveling actuator 240 is or includes a hydraulic cylinder. In other embodiments, the rear right leveling actuator 240 is or includes another type of actuator (e.g., a pneumatic cylinder, an electric actuator, etc.).

As shown in FIGS. 12 and 13, the rear right trailing arm 151 includes a fourth coupler, shown as steering actuator coupler 162, positioned along an exterior edge/surface of the lateral member 154 of the rear right trailing arm 151. As shown in FIGS. 12 and 13, the rear right leveling assembly 150 includes a third steering actuator, shown as rear right steering actuator 250, having (i) a first end pivotally coupled to the steering actuator coupler 162 of the rear right trailing arm 151 and (ii) an opposing second end pivotally coupled to a respective one of the drive actuators 18 (e.g., a rear right drive actuator, etc.). According to an exemplary embodiment, the rear right steering actuator 250 is positioned to facilitate independently and selectively pivoting (i.e., steering) the respective one of the drive actuators 18 and the tractive element 16 corresponding therewith relative to the rear right trailing arm 151 about the tractive element coupler 158 (e.g., about a vertical axis defined thereby, etc.). According to an exemplary embodiment, the rear right steering actuator 250 is or includes a hydraulic cylinder. In other embodiments, the rear right steering actuator 250 is or includes another type of actuator (e.g., a pneumatic cylinder, an electric actuator, etc.).

As shown in FIGS. 2-4, 7, 8, and 10-13, the rear left leveling assembly 170 includes a fourth arm, shown as rear left trailing arm 171, having a first portion, shown as longitudinal member 172, and a second portion, shown as lateral member 174, extending from the longitudinal member 172. According to an exemplary embodiment, the lateral member 174 extends at an angle substantially perpendicular to the longitudinal member 172 (e.g., such that the rear left trailing arm 171 is "L-shaped," etc.). In other embodiments, the lateral member 174 extends at an angle that is obtuse (e.g., greater than ninety degrees, etc.) to the longitudinal member 172. According to an exemplary embodiment, the longitudinal member 172 and the lateral member 174 are integrally formed or otherwise permanently coupled to each other (e.g., welded, etc.) such that the rear left trailing arm 171 has a unitary structure. In other embodiments, the longitudinal member 172 and the lateral member 174 are fastened together (e.g., using bolts, etc.).

As shown in FIGS. 2-4, 7, 8, and 10-13, the rear left trailing arm 171 includes (i) a first coupler, shown as base coupler 176, positioned at a free end of the longitudinal member 172 and (ii) a second coupler, shown as tractive element coupler 178, positioned at a free end of the lateral member 174. As shown in FIGS. 2 and 4, the base coupler 176 is configured to interface with the lower left pivot 38 to pivotally couple the rear left trailing arm 171 to the rear end 30 of the lift base 12. As shown in FIGS. 3, 7, 8, 10, and 11, the tractive element coupler 178 is configured to interface with a respective one of the tractive elements 16 (e.g., a rear left tractive element, etc.) such that the orientation of the respective one of the tractive elements 16 is fixed (e.g., non-steerable, etc.). As shown in FIGS. 12 and 13, the tractive element coupler 178 is alternatively configured to interface with a respective one of the drive actuators 18 such that the respective one of the drive actuators 18 and the tractive element 16 corresponding therewith (e.g., coupled thereto, driven thereby, etc.) is pivotally coupled (e.g., pinned, about a vertical axis defined by the pivot point, etc.) to the lateral member 174 of the rear left trailing arm 171.

As shown in FIGS. 2, 3, and 10-13, the rear left trailing arm 171 includes a third coupler, shown as leveling actuator coupler 180, positioned along an interior edge/surface of the rear left trailing arm 171 proximate the interface between the longitudinal member 172 and the lateral member 154. As shown in FIGS. 2-4, 7, 8, and 11-13, the rear left leveling assembly 170 includes a fourth leveling actuator, shown as rear left leveling actuator 260, having (i) a first end, shown as base end 262, pivotally coupled to the upper left pivot 34 of the lift base 12 and (ii) an opposing second end, shown as arm end 264, pivotally coupled to the leveling actuator coupler 180 of the rear left trailing arm 171. According to an exemplary embodiment, the rear left leveling actuator 260 is positioned to facilitate independently and selectively pivoting the rear left trailing arm 171 relative to the rear end 30 of the lift base 12 about the lower left pivot 38 (e.g., about a lateral axis defined thereby, etc.). According to an exemplary embodiment, the rear left leveling actuator 260 is or includes a hydraulic cylinder. In other embodiments, the rear left leveling actuator 260 is or includes another type of actuator (e.g., a pneumatic cylinder, an electric actuator, etc.).

As shown in FIGS. 12 and 13, the rear left trailing arm 171 includes a fourth coupler, shown as steering actuator coupler 182, positioned along an exterior edge/surface of the lateral member 174 of the rear left trailing arm 171. As shown in FIGS. 12 and 13, the rear left leveling assembly 170 includes a fourth steering actuator, shown as rear left steering actuator 270, having (i) a first end pivotally coupled to the steering actuator coupler 182 of the rear left trailing arm 171 and (ii) an opposing second end pivotally coupled to a respective one of the drive actuators 18 (e.g., a rear left drive actuator, etc.). According to an exemplary embodiment, the rear left steering actuator 270 is positioned to facilitate independently and selectively pivoting (i.e., steering) the respective one of the drive actuators 18 and the tractive element 16 corresponding therewith relative to the rear left trailing arm 171 about the tractive element coupler 178 (e.g., about a vertical axis defined thereby, etc.). According to an exemplary embodiment, the rear left steering actuator 270 is or includes a hydraulic cylinder. In other embodiments, the rear left steering actuator 270 is or includes another type of actuator (e.g., a pneumatic cylinder, an electric actuator, etc.).

According to the exemplary embodiment shown in FIGS. 2, 3, 6, 7, and 11, the front right steering actuator 210 and the front left steering actuator 230 facilitate providing two-wheel steering. In such an embodiment, the rear right trailing arm 151 and the rear left trailing arm 171 may have a different shape than the front right trailing arm 111 and the front left trailing arm 131 (e.g., due to having a non-steerable tractive element, etc.). According to the exemplary embodiment shown in FIGS. 12 and 13, the front right steering actuator 210, the front left steering actuator 230, the rear right steering actuator 250, and the rear left steering actuator 270 facilitate providing four-wheel steering. In such an embodiment, the rear right trailing arm 151 and the rear left trailing arm 171 may have the same or substantially the same shape as the front right trailing arm 111 and the front left trailing arm 131 such that the rear trailing arms and the front trailing arms are interchangeable. In other embodiments, the lift device 10 does not include the front right steering actuator 210, the front left steering actuator 230, the rear right steering actuator 250, and the rear left steering actuator 270. In such embodiments, the direction of the lift device 10 may be controlled using skid steering.

As shown in FIGS. 8 and 10-15, the front right trailing arm 111 includes a first angled portion, shown as angled plate 124, disposed along the bottom of the lateral member 114 and that has a first extension, shown as angled projection 126, extending forward of the lateral member 114 and past the front right steering actuator 210. As shown in FIGS. 8 and 10-15, the front left trailing arm 131 includes a second angled portion, shown as angled plate 144, disposed along the bottom of the lateral member 134 and that has a second extension, shown as angled projection 146, extending forward of the lateral member 134 and past the front left steering actuator 230. As shown in FIG. 10, the rear right trailing arm 151 includes a third angled portion, shown as angled plate 164, disposed along the bottom of the lateral member 154. In some embodiments, as shown in FIGS. 12 and 13, the angled plate 164 has a third extension, shown as angled projection 166, extending forward of the lateral member 154 and past the rear right steering actuator 250. As shown in FIG. 10, the rear left trailing arm 171 includes a fourth angled portion, shown as angled plate 184, disposed along the bottom of the lateral member 174. In some embodiments, as shown in FIGS. 12 and 13, the angled plate 184 has a fourth extension, shown as angled projection 186, extending forward of the lateral member 174 and past the rear left steering actuator 270.

According to an exemplary embodiment, the angled projection 126, the angled projection 146, the angled projection 166, and the angled projection 186 are configured (e.g., positioned, shaped, etc.) to protect the front right steering actuator 210, the front left steering actuator 230, the rear right steering actuator 250, and the rear left steering actuator 270, respectively. According to an exemplary embodiment, the angled plate 124, the angled plate 144, the angled plate 164, and the angled plate 184 are configured (e.g., positioned, shaped, etc.) to improve ground clearance of the lift base 12. According to an exemplary embodiment, the shape of the front right trailing arm 111, the front left trailing arm 131, the rear right trailing arm 151, and the rear left trailing arm 171 provide about eight inches of ground clearance while the lift device 10 is on a ten-degree side slope.

According to an exemplary embodiment, the front right trailing arm 111, the front left trailing arm 131, the rear right trailing arm 151, and the rear left trailing arm 171 are shaped to optimize the stroke of the front right leveling actuator 200, the front left leveling actuator 220, the rear right leveling actuator 240, and the rear left leveling actuator 260. One example of such optimization is shown in FIG. 19. Specifically, as shown in FIG. 19, the front right trailing arm 111, the front left trailing arm 131, the rear right trailing arm 151, and the rear left trailing arm 171 are shaped such that (i) the front right leveling actuator 200, the front left leveling actuator 220, the rear right leveling actuator 240, and the rear left leveling actuator 260 may be fully retracted and (ii) the front right trailing arm 111, the front left trailing arm 131, the rear right trailing arm 151, and the rear left trailing arm 171 may pivot sufficiently to provide a minimum ground clearance h between the bottom plate 23 of the lift base 12 and a ground surface. According to an exemplary embodiment, the minimum ground clearance h is three inches or less (e.g., 3, 2.75, 2.5, 2.25 2, 1.5, 1.25, 1, 0.75, 0.5, etc. inches). According to an exemplary embodiment, the bottom plate 23 is a solid plate manufactured from a metal material (e.g., steel, etc.). Such a solid plate provides increased protection by preventing ingress and damage to the internals of the lift base 12.

Figure 23:
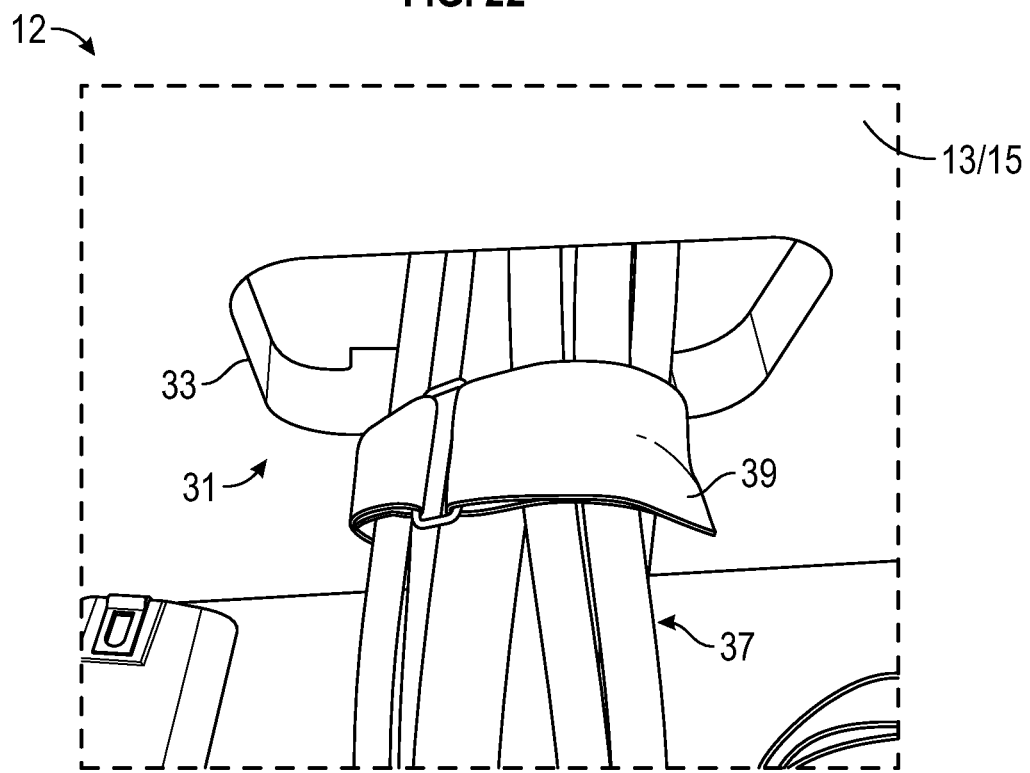
Figure 24:
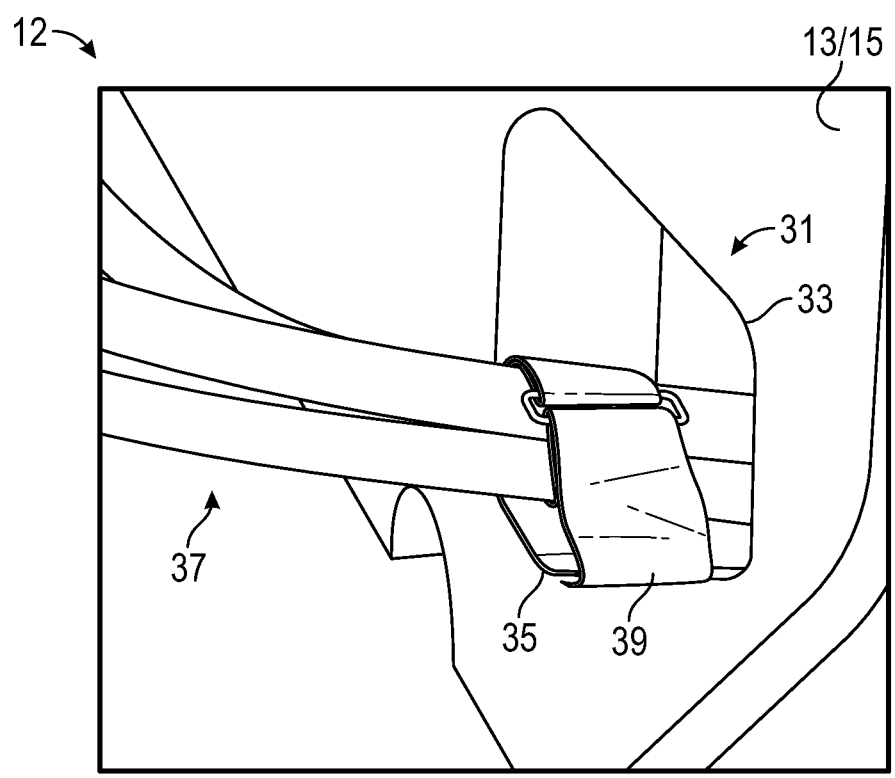

As shown in FIGS. 9 and 22-24, the front plate 13 and the rear plate 15 of the lift base 12 each include a plurality of routing features, shown as routing features 31. As shown in FIGS. 22-24, each of the routing features 31 defines an aperture, shown as through-hole 33, and includes an extension plate, shown as tab 35, (i) positioned at the bottom of the through-hole 33 and (ii) extending from the front plate 13 or the rear plate 15 into the interior chamber 25 of the lift base 12. As shown in FIGS. 23 and 24, the through-holes 33 of the routing features 31 are configured to facilitate passing hosing and/or wiring, shown as hosing and/or wiring 37, from the interior chamber 25 of the lift base 12 through the front plate 13 and/or the rear plate 15 to various components of the lift device 10 positioned outside of the lift base 12 (e.g., the drive actuators 18, the front right leveling actuator 200, the front right steering actuator 210, the front left leveling actuator 220, the front left steering actuator 230, the rear right leveling actuator 240, the rear right steering actuator 250, the rear left leveling actuator 260, the rear left steering actuator 270, sensors, etc.). The hosing and/or wiring 37 may include hosing for a hydraulic circuit to facilitate the operation of hydraulically-operated components of the lift device 10, hosing for a pneumatic circuit to facilitate the operation of pneumatically-operated components of the lift device 10, and/or electrical wiring to facilitate the operation of electrically-operated components of the lift device 10 (e.g., for the actuator circuit 300, etc.). As shown in FIGS. 23 and 24, a plurality of individual hoses and/or wiring of the hoses and/or wiring 37 lie on the tabs 35 and the tabs 35 facilitate selectively retaining the plurality of individual hoses and/or wiring of the hosing and/or wiring 37 together using a retaining element, shown as retainer 39. As shown in FIG. 22, each of the tabs 35 defines indents, shown as notches 41, along the edges thereof to prevent the retainer 39 from sliding off of the tabs 35. The retainer 39 may include a strap, a Velcro strap, an elastic band, a zip-tie and/or still another suitable retaining element to secure the hosing and/or wiring 37 to the tabs 35.

Figure 16:
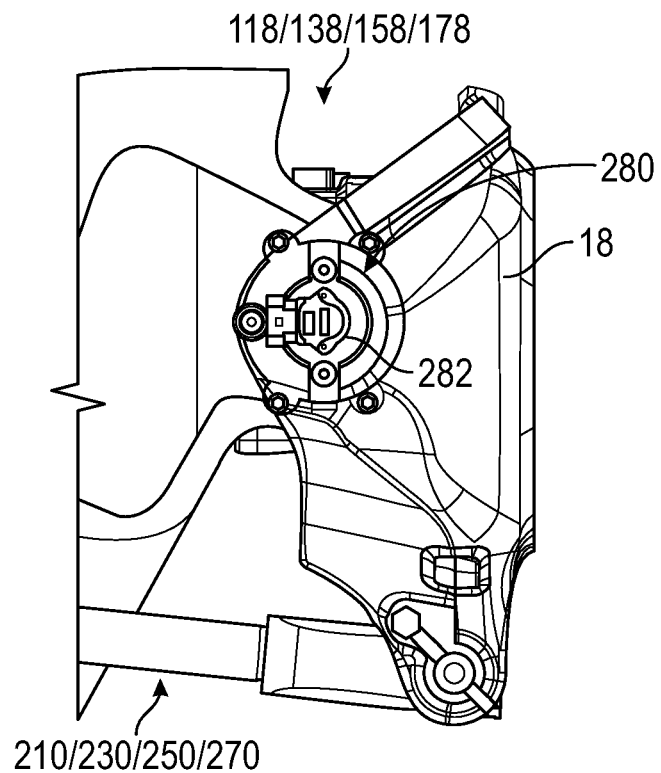
Figure 17:
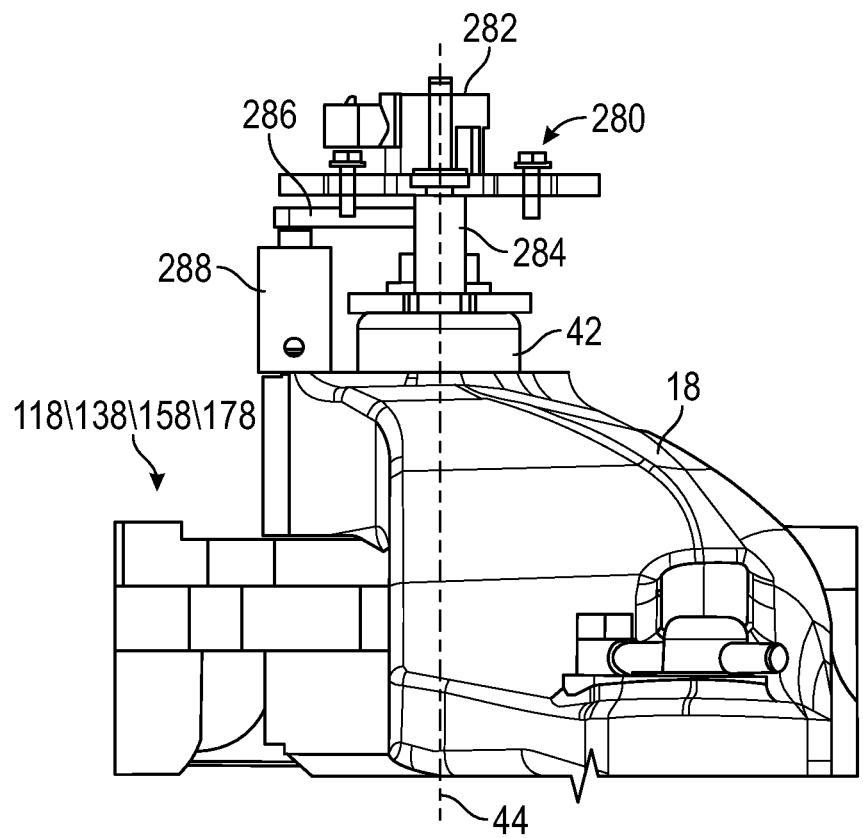

According to an exemplary embodiment, the front right steering actuator 210, the front left steering actuator 230, the rear right steering actuator 250, and the rear left steering actuator 270 each have separate inputs (e.g., hydraulic inputs, etc.) to facilitate precise steer geometry control. As shown in FIGS. 14-17, the lift device 10 includes a plurality of steering sensors, shown as steering sensors 280. As shown in FIG. 17, each of the steering sensors 280 is positioned atop a respective pin, shown as kingpin 42, that pivotally couples one of the drive actuators 18 to one of the tractive element coupler 118 of the front right trailing arm 111, the tractive element coupler 138 of the front left trailing arm 131, the tractive element coupler 158 of the rear right trailing arm 151, and the tractive element coupler 178 of the rear left trailing arm 171 about a pivot axis, shown as steer axis 44. According to an exemplary embodiment, the steering sensors 280 are configured to acquire steering data to facilitate monitoring the current position (e.g., rotation angle about the steer axis 44, etc.) of each of the tractive elements 16. As shown in FIGS. 16 and 17, each of the steering sensors 280 includes a body, shown as sensor body 282, that remains stationary at the center of the kingpin 42; a spindle, shown as spindle 284, coupled to the top of the kingpin 42 and rotates therewith about the steer axis 44; an extension, shown as boss 286, extending from the spindle 284; and an arm, shown as rotary arm 288, affixed to the spindle 284 and held captive by the boss 286. According to an exemplary embodiment, the rotary arm 288 includes an internal spring and sensor shaft disposed therein. The internal spring is positioned to bias the sensor shaft within the boss 286 to ensure constant contact therewith and output.

Figure 20:
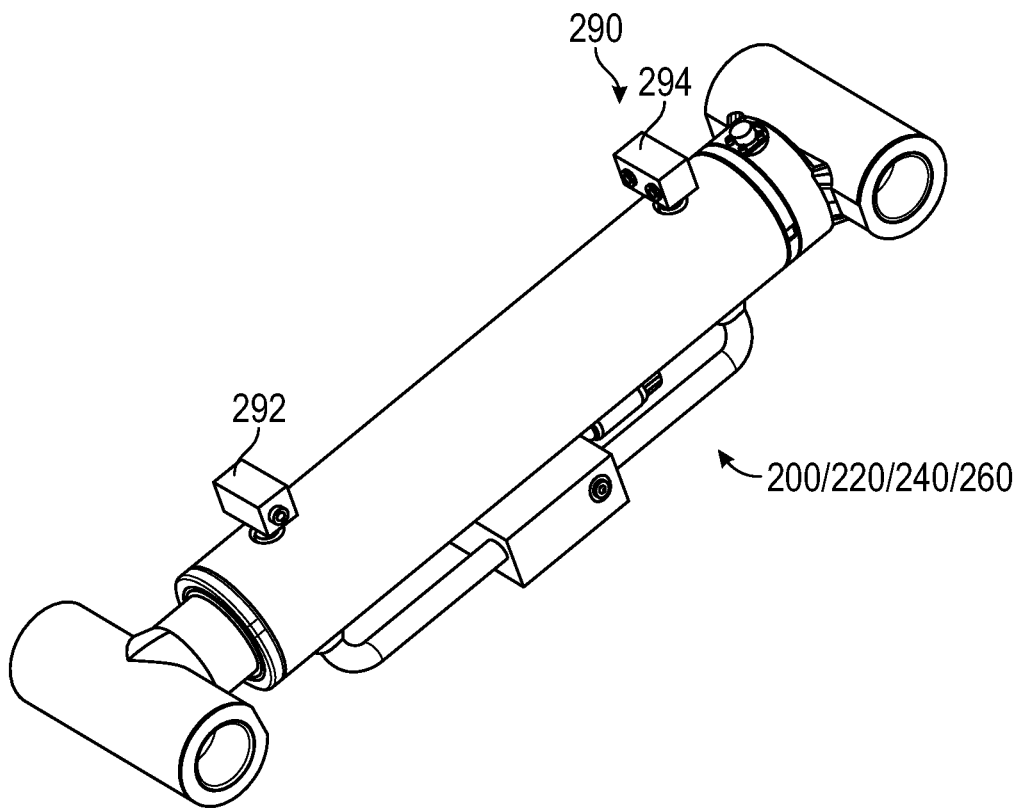

As shown in FIGS. 18-21, each of the front right leveling actuator 200, the front left leveling actuator 220, the rear right leveling actuator 240, and the rear left leveling actuator 260 includes a pressure sensor assembly, shown as pressure sensor assembly 290. As shown in FIG. 20, each of the pressure sensor assemblies 290 includes (i) a first block, shown as pressure sensor mounting block 292, configured to couple to a first end of the cylinder of a respective one of the front right leveling actuator 200, the front left leveling actuator 220, the rear right leveling actuator 240, and the rear left leveling actuator 260 and (ii) a second block, shown as pressure sensor mounting block 294, configured to couple to an opposing second end of the cylinder of the respective one of the front right leveling actuator 200, the front left leveling actuator 220, the rear right leveling actuator 240, and the rear left leveling actuator 260. According to an exemplary embodiment, the pressure sensor mounting block 292 and the pressure sensor mounting block 294 are configured to facilitate coupling one or more pressure sensors (e.g., the load sensors 408, etc.) to the corresponding leveling actuator to facilitate acquiring pressure data regarding a bore side pressure and/or a rod side pressure within each of the front right leveling actuator 200, the front left leveling actuator 220, the rear right leveling actuator 240, and the rear left leveling actuator 260. In some embodiments, the pressure sensor mounting block 292 and/or the pressure sensor mounting block 294 are configured to each facilitate coupling a plurality of pressure sensors (e.g., two each, etc.) to the corresponding leveling actuator (e.g., for a total of four or more pressure sensors per leveling actuator, etc.).

Figure 21:
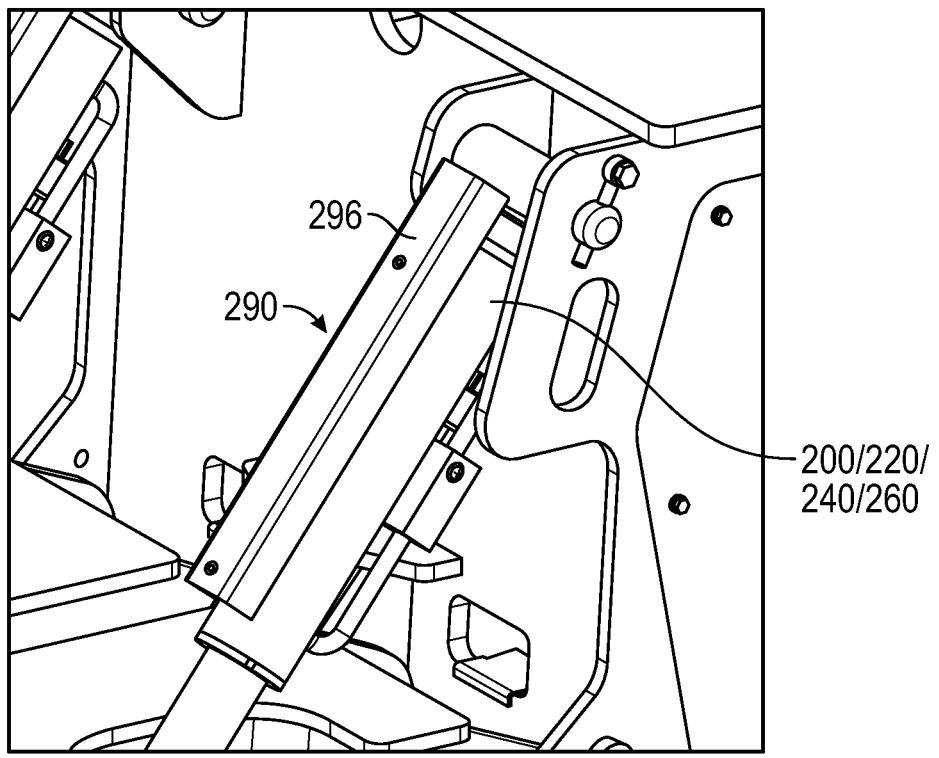

As shown in FIGS. 18, 19, and 21, each of the pressure sensor assemblies 290 includes a cover, shown as cap 296. According to exemplary embodiment, each of the caps 296 (i) selectively couples (e.g., via fasteners, a snap fit, etc.) to the pressure sensor mounting block 292 and the pressure sensor mounting block 294 of a respective leveling actuator and (ii) extends along the cylinder of the respective leveling actuator to provide protection for the pressure sensors and/or the cylinder.

As shown in FIGS. 1 and 2, the lift device 10 includes an actuator circuit, shown as actuator circuit 300, and a control system, shown as lift device control system 400. According to an exemplary embodiment, the actuator circuit 300 includes a hydraulic circuit configured to facilitate operating (e.g., driving the extension and/or retraction of, etc.) the front right leveling actuator 200, the front right steering actuator 210, the front left leveling actuator 220, the front left steering actuator 230, the rear right leveling actuator 240, the rear right steering actuator 250, the rear left leveling actuator 260, the rear left steering actuator 270, and/or the drive actuators 18 (e.g., in embodiments where one or more of the respective actuators include hydraulic cylinders, etc.). In other embodiments, the actuator circuit 300 additionally or alternatively includes an electric circuit (e.g., in embodiments where one or more of the actuators include electric actuators, etc.) and/or a pneumatic circuit (e.g., in embodiments where one or more of the actuators include pneumatic cylinders, etc.). According to an exemplary embodiment, the lift device control system 400 is configured to control the operation of the actuator circuit 300 and thereby control the front right leveling actuator 200, the front right steering actuator 210, the front left leveling actuator 220, the front left steering actuator 230, the rear right leveling actuator 240, the rear right steering actuator 250, the rear left leveling actuator 260, the rear left steering actuator 270, and/or the drive actuators 18 (e.g., the extension and/or retraction thereof; pitch, roll, and/or height adjustment of the lift base 12; etc.).

Figure 25:
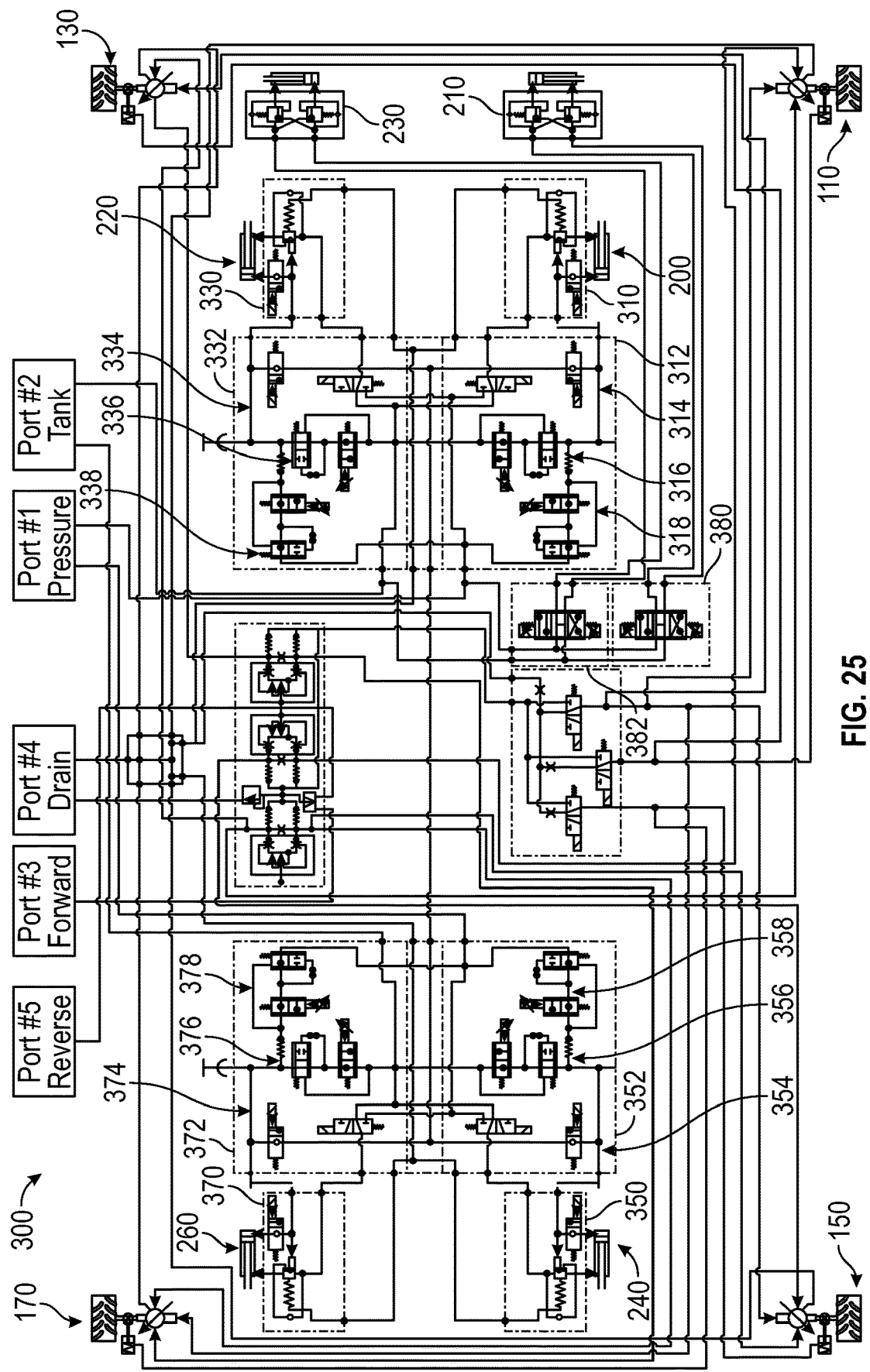
FIG. 25 is a schematic diagram of an actuator circuit for the leveling system of the lift device of FIG. 1, according to an exemplary embodiment.
Figure 30:
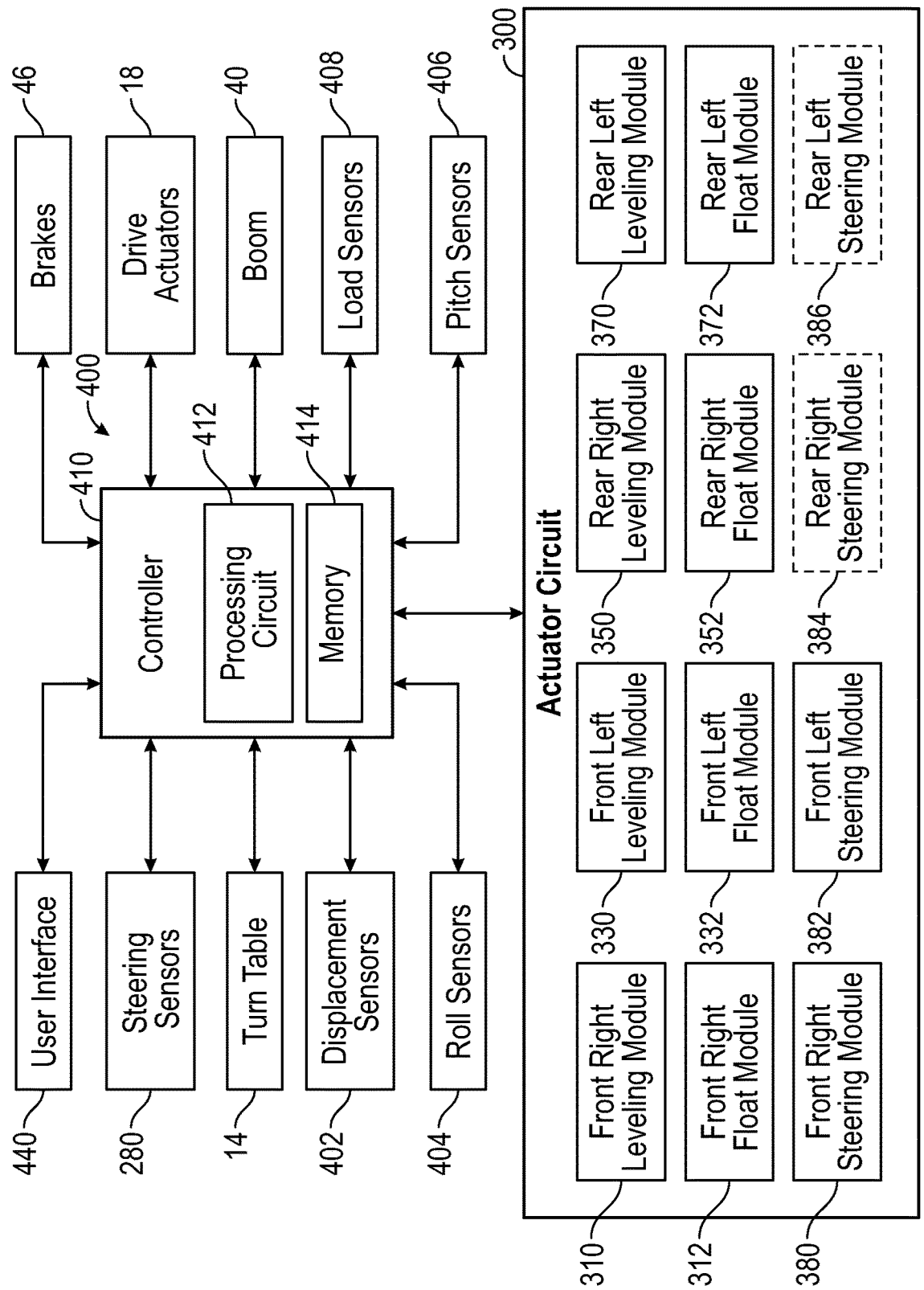
FIG. 30 is a schematic block diagram of a control system of the lift device of FIG. 1, according to an exemplary embodiment.

According to the exemplary embodiment shown in FIGS. 25 and 30, the actuator circuit 300 includes the front right leveling actuator 200, the front right steering actuator 210, the front left leveling actuator 220, the front left steering actuator 230, the rear right leveling actuator 240, and the rear left leveling actuator 260. In some embodiments, the actuator circuit 300 additionally includes the rear right steering actuator 250 and the rear left steering actuator 270. As shown in FIGS. 25 and 30, the actuator circuit 300 further includes a first leveling module, shown as front right leveling module 310, a first float module, shown as front right float module 312, a second leveling module, shown as front left leveling module 330, a second float module, shown as front left float module 332, a third leveling module, shown as rear right leveling module 350, a third float module, shown as rear right float module 352, a fourth leveling module, shown as rear left leveling module 370, a fourth float module, shown as rear left float module 372, a first steering module, shown as front right steering module 380, and a second steering module, shown as front left steering module 382. In some embodiments (e.g., embodiments where the actuator circuit 300 includes the rear right steering actuator 250 and the rear left steering actuator 270, etc.), as shown in FIG. 30, the actuator circuit 300 additionally includes a third steering module, shown as rear right steering module 384, and a fourth steering module, shown as rear left steering module 386.

As shown in FIG. 25, the front right leveling module 310 (e.g., a valve, a valve assembly, etc.) is associated with and fluidly coupled to the front right leveling actuator 200. According to an exemplary embodiment, the front right leveling module 310 is fluidly coupled to a fluid source (e.g., a hydraulic tank, a hydraulic pump, etc.) and configured to facilitate an extension and retraction operation of the front right leveling actuator 200 (e.g., by providing hydraulic fluid to or releasing hydraulic fluid from the front right leveling actuator 200, etc.). The front right leveling module 310 therefore facilitates actively and selectively pivoting the front right trailing arm 111 associated with the front right leveling actuator 200 about the lower right pivot 26. As shown in FIG. 25, the front left leveling module 330 (e.g., a valve, a valve assembly, etc.) is associated with and fluidly coupled to the front left leveling actuator 220. According to an exemplary embodiment, the front left leveling module 330 is fluidly coupled to the fluid source and configured to facilitate an extension and retraction operation of the front left leveling actuator 220 (e.g., by providing hydraulic fluid to or releasing hydraulic fluid from the front left leveling actuator 220, etc.). The front left leveling module 330 therefore facilitates actively and selectively pivoting the front left trailing arm 131 associated with the front left leveling actuator 220 about the lower left pivot 28.

As shown in FIG. 25, the rear right leveling module 350 (e.g., a valve, a valve assembly, etc.) is associated with and fluidly coupled to the rear right leveling actuator 240. According to an exemplary embodiment, the rear right leveling module 350 is fluidly coupled to the fluid source and configured to facilitate an extension and retraction operation of the rear right leveling actuator 240 (e.g., by providing hydraulic fluid to or releasing hydraulic fluid from the rear right leveling actuator 240, etc.). The rear right leveling module 350 therefore facilitates actively and selectively pivoting the rear right trailing arm 151 associated with the rear right leveling actuator 240 about the lower right pivot 36. As shown in FIG. 25, the rear left leveling module 370 (e.g., a valve, a valve assembly, etc.) is associated with and fluidly coupled to the rear left leveling actuator 260. According to an exemplary embodiment, the rear left leveling module 370 is fluidly coupled to the fluid source and configured to facilitate an extension and retraction operation of the rear left leveling actuator 260 (e.g., by providing hydraulic fluid to or releasing hydraulic fluid from the rear left leveling actuator 260, etc.). The rear left leveling module 370 therefore facilitates actively and selectively pivoting the rear left trailing arm 171 associated with the rear left leveling actuator 260 about the lower left pivot 38.

As shown in FIG. 25, the front right float module 312 includes a first float valve, shown as front right float valve 314, first float controls (e.g., a valve, a valve assembly, etc.), shown as front right retract float controls 316, and second float controls (e.g., a valve, a valve assembly, etc.), shown as front right extend float controls 318. According to an exemplary embodiment, the front right float valve 314 is operable in a first state (e.g., engaged, disengaged, during an active mode, etc.) and a second state (e.g., disengaged, engaged, during a float mode, etc.). In the first state, (i) the front right float valve 314 is configured to fluidly isolate or fluidly decouple the front right leveling actuator 200 from the front left leveling actuator 220, the rear right leveling actuator 240, and the rear left leveling actuator 260 and (ii) extension and retraction of the front right leveling actuator 200 is independently and actively controllable (e.g., via the front right leveling module 310, etc.). In the second state, (i) the front right float valve 314 is configured to fluidly couple the front right leveling actuator 200 to a respective one of the front left leveling actuator 220, the rear right leveling actuator 240, and the rear left leveling actuator 260 (e.g., based on which leveling assembly also has a float valve in the second state, etc.) and (ii) extension and retraction of the front right leveling actuator 200 is passively controllable (i.e., the front right leveling actuator 200 freely floats). In some embodiments, the front right float valve 314 is a variable valve (e.g., a proportional valve, etc.) that can be operated in various positions between fully open and fully closed. Such a variable valve may facilitate controlling a rate at which the front right leveling actuator 200 "floats" (e.g., floats quicker if more open than if more closed, etc.).

According to an exemplary embodiment, fluidly coupling the front right leveling actuator 200 with a respective one of the other leveling actuators (i.e., the front left leveling actuator 220, the rear right leveling actuator 240, or the rear left leveling actuator 260) causes the two actuators to emulate the function of a conventional pinned axle where rotation (i.e., roll) occurs freely about a central pin, however, here the central pin is a "virtual pivot point." According to an exemplary embodiment, the front right retract float controls 316 and the front right extend float controls 318, independent of or in combination with the float controls associated with the leveling actuator fluidly coupled with the front right leveling actuator 200, are configured to facilitate selectively removing or adding, respectively, fluid to the fluidly coupled leveling actuators (i.e., the front right leveling actuator 200 and a respective one of the front left leveling actuator 220, the rear right leveling actuator 240, and the rear left leveling actuator 260) to decrease or increase, respectively, the height of the virtual pivot point of the two fluidly coupled leveling actuators relative to ground by decreasing or increasing, respectively, the volume of fluid flowing between the two fluidly coupled leveling actuators.

As shown in FIG. 25, the front left float module 332 includes a second float valve, shown as front left float valve 334, first float controls (e.g., a valve, a valve assembly, etc.), shown as front left retract float controls 336, and second float controls (e.g., a valve, a valve assembly, etc.), shown as front left extend float controls 338. According to an exemplary embodiment, the front left float valve 334 is operable in a first state (e.g., engaged, disengaged, during an active mode, etc.) and a second state (e.g., disengaged, engaged, during a float mode, etc.). In the first state, (i) the front left float valve 334 is configured to fluidly isolate or fluidly decouple the front left leveling actuator 220 from the front right leveling actuator 200, the rear right leveling actuator 240, and the rear left leveling actuator 260 and (ii) extension and retraction of the front left leveling actuator 220 is independently and actively controllable (e.g., via the front left leveling module 330, etc.). In the second state, (i) the front left float valve 334 is configured to fluidly couple the front left leveling actuator 220 to a respective one of the front right leveling actuator 200, the rear right leveling actuator 240, and the rear left leveling actuator 260 (e.g., based on which leveling assembly also has a float valve in the second state, etc.) and (ii) extension and retraction of the front left leveling actuator 220 is passively controllable (i.e., the front left leveling actuator 220 freely floats). In some embodiments, the front left float valve 334 is a variable valve (e.g., a proportional valve, etc.) that can be operated in various positions between fully open and fully closed. Such a variable valve may facilitate controlling a rate at which the front left leveling actuator 220 "floats" (e.g., floats quicker if more open than if more closed, etc.).

According to an exemplary embodiment, fluidly coupling the front left leveling actuator 220 with a respective one of the other leveling actuators (i.e., the front right leveling actuator 200, the rear right leveling actuator 240, or the rear left leveling actuator 260) causes the two actuators to emulate the function of a conventional pinned axle where rotation (i.e., roll) occurs freely about a central pin, however, here the central pin is a "virtual pivot point." According to an exemplary embodiment, the front left retract float controls 336 and the front left extend float controls 338, independent of or in combination with the float controls associated with the leveling actuator fluidly coupled with the front left leveling actuator 220, are configured to facilitate selectively removing or adding, respectively, fluid to the fluidly coupled leveling actuators (i.e., the front left leveling actuator 220 and a respective one of the front right leveling actuator 200, the rear right leveling actuator 240, and the rear left leveling actuator 260) to decrease or increase, respectively, the height of the virtual pivot point of the two fluidly coupled leveling actuators relative to ground by decreasing or increasing, respectively, the volume of fluid flowing between the two fluidly coupled leveling actuators.

As shown in FIG. 25, the rear right float module 352 includes a third float valve, shown as rear right float valve 354, first float controls (e.g., a valve, a valve assembly, etc.), shown as rear right retract float controls 356, and second float controls (e.g., a valve, a valve assembly, etc.), shown as rear right extend float controls 358. According to an exemplary embodiment, the rear right float valve 354 is operable in a first state (e.g., engaged, disengaged, during an active mode, etc.) and a second state (e.g., disengaged, engaged, during a float mode, etc.). In the first state, (i) the rear right float valve 354 is configured to fluidly isolate or fluidly decouple the rear right leveling actuator 240 from the front right leveling actuator 200, the front left leveling actuator 220, and the rear left leveling actuator 260 and (ii) extension and retraction of the rear right leveling actuator 240 is independently and actively controllable (e.g., via the rear right leveling module 350, etc.). In the second state, (i) the rear right float valve 354 is configured to fluidly couple the rear right leveling actuator 240 to a respective one of the front right leveling actuator 200, the front left leveling actuator 220, and the rear left leveling actuator 260 (e.g., based on which leveling assembly also has a float valve in the second state, etc.) and (ii) extension and retraction of the rear right leveling actuator 240 is passively controllable (i.e., the rear right leveling actuator 240 freely floats). In some embodiments, the rear right float valve 354 is a variable valve (e.g., a proportional valve, etc.) that can be operated in various positions between fully open and fully closed. Such a variable valve may facilitate controlling a rate at which the rear right leveling actuator 240 "floats" (e.g., floats quicker if more open than if more closed, etc.).

According to an exemplary embodiment, fluidly coupling the rear right leveling actuator 240 with a respective one of the other leveling actuators (i.e., the front right leveling actuator 200, the front left leveling actuator 220, or the rear left leveling actuator 260) causes the two actuators to emulate the function of a conventional pinned axle where rotation (i.e., roll) occurs freely about a central pin, however, here the central pin is a "virtual pivot point." According to an exemplary embodiment, the rear right retract float controls 356 and the rear right extend float controls 358, independent of or in combination with the float controls associated with the leveling actuator fluidly coupled with the rear right leveling actuator 240, are configured to facilitate selectively removing or adding, respectively, fluid to the fluidly coupled leveling actuators (i.e., the rear right leveling actuator 240 and a respective one of the front right leveling actuator 200, the front left leveling actuator 220, and the rear left leveling actuator 260) to decrease or increase, respectively, the height of the virtual pivot point of the two fluidly coupled leveling actuators relative to ground by decreasing or increasing, respectively, the volume of fluid flowing between the two fluidly coupled leveling actuators.

As shown in FIG. 25, the rear left float module 372 includes a fourth float valve, shown as rear left float valve 374, first float controls (e.g., a valve, a valve assembly, etc.), shown as rear left retract float controls 376, and second float controls (e.g., a valve, a valve assembly, etc.), shown as rear left extend float controls 378. According to an exemplary embodiment, the rear left float valve 374 is operable in a first state (e.g., engaged, disengaged, during an active mode, etc.) and a second state (e.g., disengaged, engaged, during a float mode, etc.). In the first state, (i) the rear left float valve 374 is configured to fluidly isolate or fluidly decouple the rear left leveling actuator 260 from the front right leveling actuator 200, the front left leveling actuator 220, and the rear right leveling actuator 240 and (ii) extension and retraction of the rear left leveling actuator 260 is independently and actively controllable (e.g., via the rear left leveling module 370, etc.). In the second state, (i) the rear left float valve 374 is configured to fluidly couple the rear left leveling actuator 260 to a respective one of the front right leveling actuator 200, the front left leveling actuator 220, and the rear right leveling actuator 240 (e.g., based on which leveling assembly also has a float valve in the second state, etc.) and (ii) extension and retraction of the rear left leveling actuator 260 is passively controllable (i.e., the rear left leveling actuator 260 freely floats). In some embodiments, the rear left float valve 374 is a variable valve (e.g., a proportional valve, etc.)

that can be operated in various positions between fully open and fully closed. Such a variable valve may facilitate controlling a rate at which the rear left leveling actuator 260 "floats" (e.g., floats quicker if more open than if more closed, etc.).

According to an exemplary embodiment, fluidly coupling the rear left leveling actuator 260 with a respective one of the other leveling actuators (i.e., the front right leveling actuator 200, the front left leveling actuator 220, or the rear right leveling actuator 240) causes the two actuators to emulate the function of a conventional pinned axle where rotation (i.e., roll) occurs freely about a central pin, however, here the central pin is a "virtual pivot point." According to an exemplary embodiment, the rear left retract float controls 376 and the rear left extend float controls 378, independent of or in combination with the float controls associated with the leveling actuator fluidly coupled with the rear left leveling actuator 260, are configured to facilitate selectively removing or adding, respectively, fluid to the fluidly coupled leveling actuators (i.e., the rear left leveling actuator 260 and a respective one of the front right leveling actuator 200, the front left leveling actuator 220, and the rear right leveling actuator 240) to decrease or increase, respectively, the height of the virtual pivot point of the two fluidly coupled leveling actuators relative to ground by decreasing or increasing, respectively, the volume of fluid flowing between the two fluidly coupled leveling actuators.

As shown in FIG. 25, the front right steering module 380 (e.g., a valve, a valve assembly, etc.) is associated with and fluidly coupled to the front right steering actuator 210. According to an exemplary embodiment, the front right steering module 380 is fluidly coupled to the fluid source and configured to facilitate an extension and retraction operation of the front right steering actuator 210 (e.g., by providing hydraulic fluid to or releasing hydraulic fluid from the front right steering actuator 210, etc.). The front right steering module 380 therefore facilitates actively and selectively turning the tractive element 16 associated with the front right steering actuator 210. As shown in FIG. 25, the front left steering module 382 (e.g., a valve, a valve assembly, etc.) is associated with and fluidly coupled to the front left steering actuator 230. According to an exemplary embodiment, the front left steering module 382 is fluidly coupled to the fluid source and configured to facilitate an extension and retraction operation of the front left steering actuator 230 (e.g., by providing hydraulic fluid to or releasing hydraulic fluid from the front left steering actuator 230, etc.). The front left steering module 390 therefore facilitates actively and selectively turning the tractive element 16 associated with the front left steering actuator 230.

According to an exemplary embodiment, the rear right steering module 384 (e.g., a valve, a valve assembly, etc.) is associated with and fluidly coupled to the rear right steering actuator 250. According to an exemplary embodiment, the rear right steering module 384 is fluidly coupled to the fluid source and configured to facilitate an extension and retraction operation of the rear right steering actuator 250 (e.g., by providing hydraulic fluid to or releasing hydraulic fluid from the rear right steering actuator 250, etc.). The rear right steering module 384 therefore facilitates actively and selectively turning the tractive element 16 associated with the rear right steering actuator 250. According to an exemplary embodiment, the rear left steering module 386 (e.g., a valve, a valve assembly, etc.) is associated with and fluidly coupled to the rear left steering actuator 270. According to an exemplary embodiment, the rear left steering module 386 is fluidly coupled to the fluid source and configured to facilitate an extension and retraction operation of the rear left steering actuator 270 (e.g., by providing hydraulic fluid to or releasing hydraulic fluid from the rear left steering actuator 270, etc.). The rear left steering module 386 therefore facilitates actively and selectively turning the tractive element 16 associated with the rear left steering actuator 270.

Figure 26:
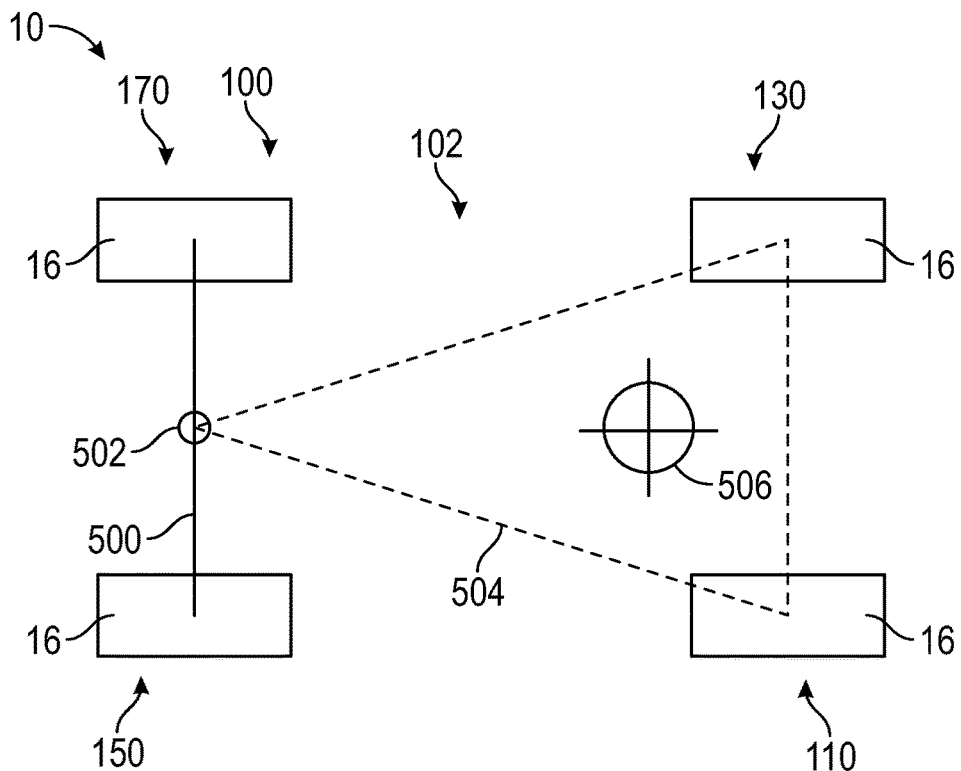
FIG. 26 is a schematic block diagram of the leveling system of the lift device of FIG. 1 in a first configuration, according to an exemplary embodiment.

By way of example, various configurations of the leveling system 100 are shown in FIGS. 26-29. As shown in FIG. 26, the leveling system 100 of the lift device 10 is arranged in a first configuration, shown as rear float configuration 102. In the rear float configuration 102, the rear right leveling actuator 240 of the rear right leveling assembly 150 and the rear left leveling actuator 260 of the rear left leveling assembly 170 are selectively fluidly coupled to each other (e.g., by engaging the rear right float valve 354 of the rear right float module 352 and the rear left float valve 374 of the rear left float module 372, while the front right float valve 314 of the front right float module 312 and the front left float valve 334 of the front left float module 332 remain disengaged, etc.) such that the rear right leveling assembly 150 and the rear left leveling assembly 170 function as if an axle, shown as virtual axle 500, extends therebetween with a pivot point, shown as virtual pivot point 502, positioned along and at a center of the virtual axle 500. The rear float configuration 102 therefore forms a triangle, shown as stability triangle 504, between the tractive element 16 of the front right leveling assembly 110, the tractive element 16 of the front left leveling assembly 130, and the virtual pivot point 502, rather than a stability rectangle or square between the four tractive elements 16 of the lift device 10.

While the leveling system 100 of the lift device 10 is arranged in the rear float configuration 102, (i) the rear right leveling assembly 150 and the rear left leveling assembly 170 freely float in response to fluid flowing freely between the rear right leveling actuator 240 and the rear left leveling actuator 260 (i.e., as the rear right leveling actuator 240 extends, the rear left leveling actuator 260 retracts, and vice versa) as the tractive elements 16 thereof encounter the terrain and (ii) the front right leveling actuator 200 of the front right leveling assembly 110 and the front left leveling actuator 220 of the front left leveling assembly 130 are each independently and actively controllable. Further, as the rear right leveling assembly 150 and the rear left leveling assembly 170 freely float while the leveling system 100 of the lift device 10 is arranged in the rear float configuration 102, the height of the virtual pivot point 502 relative to ground may be selectively adjusted (e.g., increased, decreased, etc.) by manipulating (e.g., increasing, decreasing, etc.) the volume of fluid flowing between the rear right leveling actuator 240 and the rear left leveling actuator 260 (e.g., using the rear right retract float controls 356, the rear right extend float controls 358, the rear left retract float controls 376, the rear left extend float controls 378, etc.).

Figure 27:
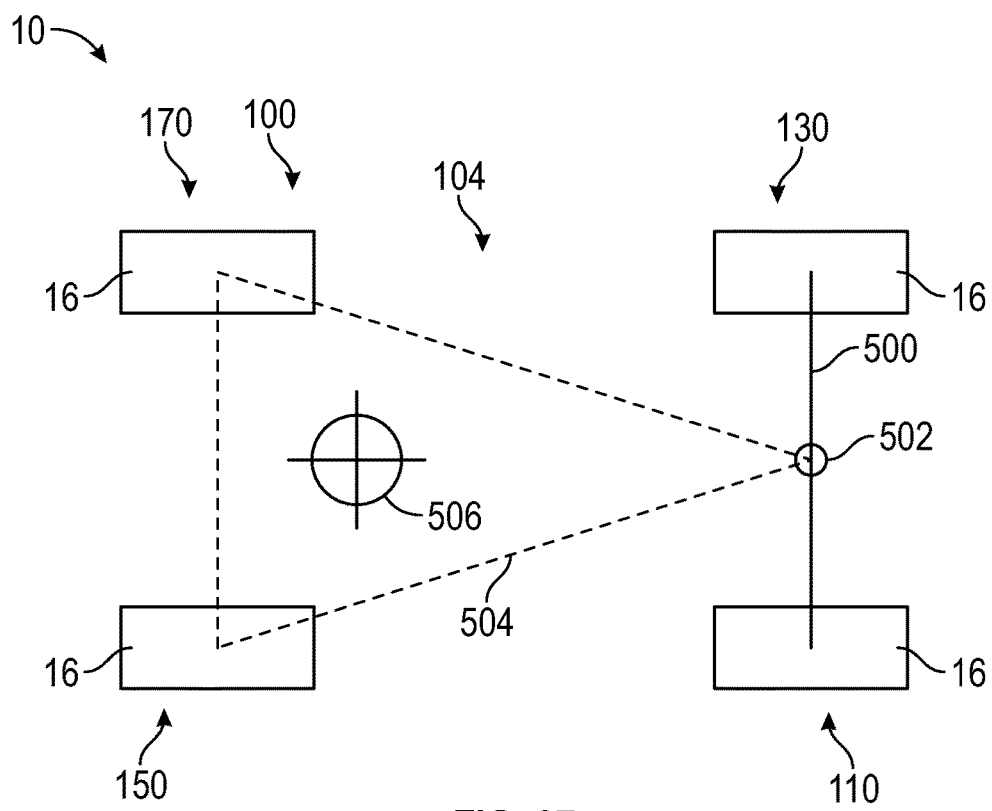
FIG. 27 is a schematic block diagram of the leveling system of the lift device of FIG. 1 in a second configuration, according to an exemplary embodiment.

As shown in FIG. 27, the leveling system 100 of the lift device 10 is arranged in a second configuration, shown as front float configuration 104. In the front float configuration 104, the front right leveling actuator 200 of the front right leveling assembly 110 and the front left leveling actuator 220 of the front left leveling assembly 130 are selectively fluidly coupled to each other (e.g., by engaging the front right float valve 314 of the front right float module 312 and the front left float valve 334 of the front left float module 332, while the rear right float valve 354 of the rear right float module 352 and the rear left float valve 374 of the rear left float module 372 remain disengaged, etc.) such that the front right leveling assembly 110 and the front left leveling assembly 130 function as if the virtual axle 500 extends therebetween with the virtual pivot point 502 positioned along and at the center of the virtual axle 500. The front float configuration 104 therefore forms the stability triangle 504 between the tractive element 16 of the rear right leveling assembly 150, the tractive element 16 of the rear left leveling assembly 170, and the virtual pivot point 502, rather than a stability rectangle or square between the four tractive elements 16 of the lift device 10.

While the leveling system 100 of the lift device 10 is arranged in the front float configuration 104, (i) the front right leveling assembly 110 and the front left leveling assembly 130 freely float in response to fluid flowing freely between the front right leveling actuator 200 and the front left leveling actuator 220 (i.e., as the front right leveling actuator 200 extends, the front left leveling actuator 220 retracts, and vice versa) as the tractive elements 16 thereof encounter the terrain and (ii) the rear right leveling actuator 240 of the rear right leveling assembly 150 and the rear left leveling actuator 260 of the rear left leveling assembly 170 are each independently and actively controllable. Further, as the front right leveling assembly 110 and the front left leveling assembly 130 freely float while the leveling system 100 of the lift device 10 is arranged in the front float configuration 104, the height of the virtual pivot point 502 relative to ground may be selectively adjusted (e.g., increased, decreased, etc.) by manipulating (e.g., increasing, decreasing, etc.) the volume of fluid flowing between the front right leveling actuator 200 and the front left leveling actuator 220 (e.g., using the front right retract float controls 316, the front right extend float controls 318, the front left retract float controls 336, the front left extend float controls 338, etc.).

Figure 28:
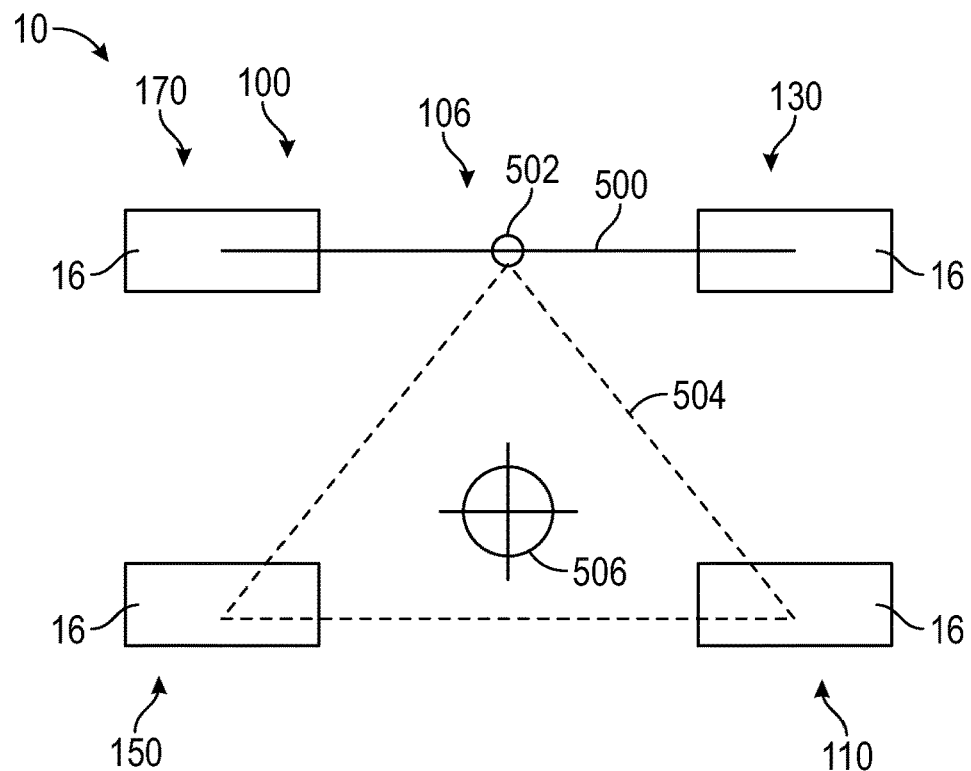
FIG. 28 is a schematic block diagram of the leveling system of the lift device of FIG. 1 in a third configuration, according to an exemplary embodiment.

As shown in FIG. 28, the leveling system 100 of the lift device 10 is arranged in a third configuration, shown as left float configuration 106. In the left float configuration 106, the front left leveling actuator 220 of the front left leveling assembly 130 and the rear left leveling actuator 260 of the rear left leveling assembly 170 are selectively fluidly coupled to each other (e.g., by engaging the front left float valve 334 of the front left float module 332 and the rear left float valve 374 of the rear left float module 372, while the front right float valve 314 of the front right float module 312 and the rear right float valve 354 of the rear right float module 352 remain disengaged, etc.) such that the front left leveling assembly 130 and the rear left leveling assembly 170 function as if the virtual axle 500 extends therebetween with the virtual pivot point 502 positioned along and at the center of the virtual axle 500. The left float configuration 106 therefore forms the stability triangle 504 between the tractive element 16 of the front right leveling assembly 110, the tractive element 16 of the rear right leveling assembly 150, and the virtual pivot point 502, rather than a stability rectangle or square between the four tractive elements 16 of the lift device 10.

While the leveling system 100 of the lift device 10 is arranged in the left float configuration 106, (i) the front left leveling assembly 130 and the rear left leveling assembly 170 freely float in response to fluid flowing freely between the front left leveling actuator 220 and the rear left leveling actuator 260 (i.e., as the front left leveling actuator 220 extends, the rear left leveling actuator 260 retracts, and vice versa) as the tractive elements 16 thereof encounter the terrain and (ii) the front right leveling assembly 110 and the rear right leveling actuator 240 of the rear right leveling assembly 150 are each independently and actively controllable. Further, as the front left leveling assembly 130 and the rear left leveling assembly 170 freely float while the leveling system 100 of the lift device 10 is arranged in the left float configuration 106, the height of the virtual pivot point 502 relative to ground may be selectively adjusted (e.g., increased, decreased, etc.) by manipulating (e.g., increasing, decreasing, etc.) the volume of fluid flowing between the front left leveling actuator 220 and the rear left leveling actuator 260 (e.g., using the front left retract float controls 336, the front left extend float controls 338, the rear left retract float controls 376, the rear left extend float controls 378, etc.).

Figure 29:
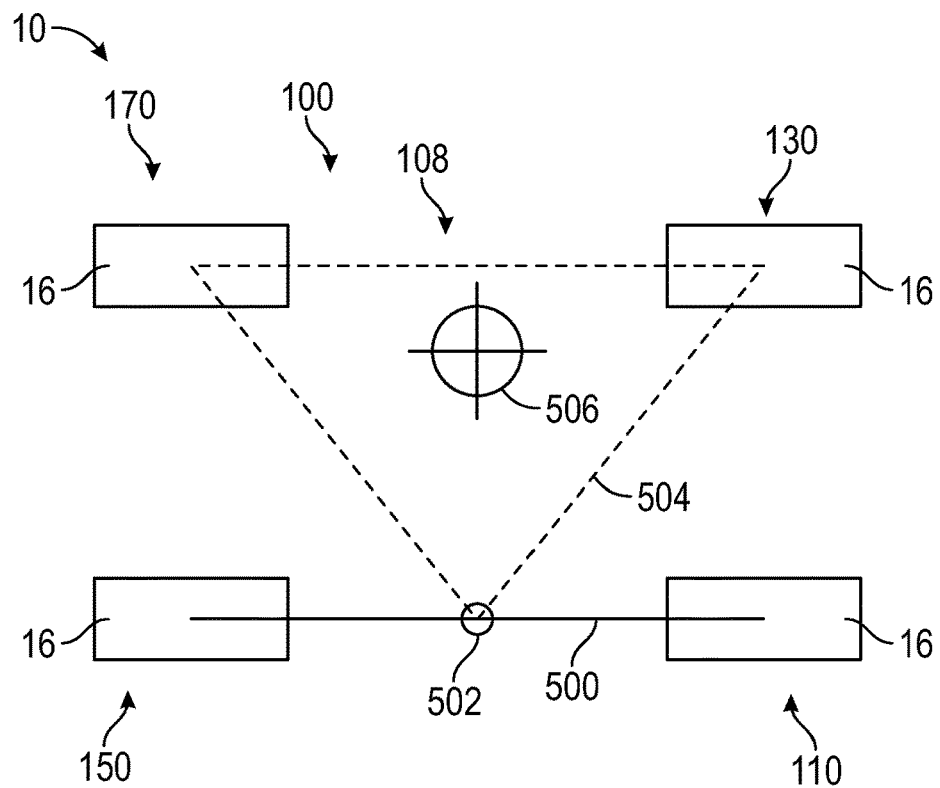
FIG. 29 is a schematic block diagram of the leveling system of the lift device of FIG. 1 in a fourth configuration, according to an exemplary embodiment.

As shown in FIG. 29, the leveling system 100 of the lift device 10 is arranged in a fourth configuration, shown as right float configuration 108. In the right float configuration 108, the front right leveling actuator 200 of the front right leveling assembly 110 and the rear right leveling actuator 240 of the rear right leveling assembly 150 are selectively fluidly coupled to each other (e.g., by engaging the front right float valve 314 of the front right float module 312 and the rear right float valve 354 of the rear right float module 352, while the front left float valve 334 of the front left float module 332 and the rear left float valve 374 of the rear left float module 372 remain disengaged, etc.) such that the front right leveling assembly 110 and the rear right leveling assembly 150 function as if the virtual axle 500 extends therebetween with the virtual pivot point 502 positioned along and at the center of the virtual axle 500. The right float configuration 108 therefore forms the stability triangle 504 between the tractive element 16 of the front left leveling assembly 130, the tractive element 16 of the rear left leveling assembly 170, and the virtual pivot point 502, rather than a stability rectangle or square between the four tractive elements 16 of the lift device 10.

While the leveling system 100 of the lift device 10 is arranged in the right float configuration 108, (i) the front right leveling assembly 110 and the rear right leveling assembly 150 freely float in response to fluid flowing freely between the front right leveling actuator 200 and the rear right leveling actuator 240 (i.e., as the front right leveling actuator 200 extends, the rear right leveling actuator 240 retracts, and vice versa) as the tractive elements 16 thereof encounter the terrain and (ii) the front left leveling actuator 220 of the front left leveling assembly 130 and the rear left leveling actuator 260 of the rear left leveling assembly 170 are each independently and actively controllable. Further, as the front right leveling assembly 110 and the rear right leveling assembly 150 freely float while the leveling system 100 of the lift device 10 is arranged in the right float configuration 108, the height of the virtual pivot point 502 relative to ground may be selectively adjusted (e.g., increased, decreased, etc.) by manipulating (e.g., increasing, decreasing, etc.) the volume of fluid flowing between the front right leveling actuator 200 and the rear right leveling actuator 240 (e.g., using the front right retract float controls 316, the front right extend float controls 318, the rear right retract float controls 356, the rear right extend float controls 358, etc.).

In some embodiments, the leveling system 100 is reconfigurable such that the front right leveling actuator 200 of the front right leveling assembly 110 and the rear left leveling actuator 260 of the rear left leveling assembly 170 are selectively fluidly coupled to each other (e.g., by engaging the front right float valve 314 of the front right float module 312 and the rear left float valve 374 of the rear left float module 372, while the front left float valve 334 of the front left float module 332 and the rear right float valve 354 of the rear right float module 352 remain disengaged, etc.) such that the front right leveling assembly 110 and the rear left leveling assembly 170 function as if the virtual axle 500 extends therebetween with the virtual pivot point 502 positioned along and at the center of the virtual axle 500. In such a configuration, (i) the front right leveling assembly 110 and the rear left leveling assembly 170 freely float in response to fluid flowing freely between the front right leveling actuator 200 and the rear left leveling actuator 260 (i.e., as the front right leveling actuator 200 extends, the rear left leveling actuator 260 retracts, and vice versa) as the tractive elements 16 thereof encounter the terrain and (ii) the front left leveling actuator 220 of the front left leveling assembly 130 and the rear right leveling actuator 240 of the rear right leveling assembly 150 are each independently and actively controllable. In other embodiments, the leveling system 100 is not reconfigurable such that the front right leveling actuator 200 of the front right leveling assembly 110 and the rear left leveling actuator 260 of the rear left leveling assembly 170 are selectively fluidly coupled to each other (e.g., in an embodiment where only adjacent leveling assemblies are fluidly couplable, etc.).

In some embodiments, the leveling system 100 is reconfigurable such that the front left leveling actuator 220 of the front left leveling assembly 130 and the rear right leveling actuator 240 of the rear right leveling assembly 150 are selectively fluidly coupled to each other (e.g., by engaging the front left float valve 334 of the front left float module 332 and the rear right float valve 354 of the rear right float module 352, while the front right float valve 314 of the front right float module 312 and the rear left float valve 374 of the rear left float module 372 remain disengaged, etc.) such that the front left leveling assembly 130 and the rear right leveling assembly 150 function as if the virtual axle 500 extends therebetween with the virtual pivot point 502 positioned along and at the center of the virtual axle 500. In such a configuration, (i) the front left leveling assembly 130 and the rear right leveling assembly 150 freely float in response to fluid flowing freely between the front left leveling actuator 220 and the rear right leveling actuator 240 (i.e., as the front left leveling actuator 220 extends, the rear right leveling actuator 240 retracts, and vice versa) as the tractive elements 16 thereof encounter the terrain and (ii) the front right leveling actuator 200 of the front right leveling assembly 110 and the rear left leveling actuator 260 of the rear left leveling assembly 170 are each independently and actively controllable. In other embodiments, the leveling system 100 is not reconfigurable such that the front left leveling actuator 220 of the front left leveling assembly 130 and the rear right leveling actuator 240 of the rear right leveling assembly 150 are selectively fluidly coupled to each other (e.g., in an embodiment where only adjacent leveling assemblies are fluidly couplable, etc.).

According to the exemplary embodiment shown in FIG. 30, the lift device control system 400 for the lift device 10 includes a controller 410. In one embodiment, the controller 410 is configured to selectively engage, selectively disengage, control, and/or otherwise communicate with components of the lift device 10 (e.g., actively control the components thereof, etc.). As shown in FIG. 30, the controller 410 is coupled to the turntable 14, the drive actuators 18, brakes 46, the boom 40, the actuator circuit 300, various sensors including the steering sensors 280, displacement sensors 402, roll sensors 404, pitch sensors 406, and load sensors 408 (e.g., pressure sensors, etc.), and a user interface 440. In other embodiments, the controller 410 is coupled to more or fewer components. By way of example, the controller 410 may send and receive signals with the turntable 14, the drive actuators 18, the brakes 46, the boom 40 (e.g., the lower lift cylinder 60, the upper lift cylinder 80, etc.), the actuator circuit 300 (e.g., the front right leveling module 310, the front right float module 312, the front left leveling module 330, the front left float module 332, the rear right leveling module 350, the rear right float module 352, the rear left leveling module 370, the rear left float module 372, the front right steering module 380, the front left steering module 382, the rear right steering module 384, the rear left steering module 386, etc.), the steering sensors 280, the displacement sensors 402, the roll sensors 404, the pitch sensors 406, the load sensors 408, and/or the user interface 440. In some embodiments, the roll sensors 404 and the pitch sensors 406 are a single sensor (e.g., an inclinometer, etc.). The controller 410 may be configured to actively control a pitch adjustment and/or a roll adjustment of the lift base 12 to at least improve the orientation of the lift base 12, the turntable 14, and/or the boom 40 relative to gravity (e.g., while driving the lift device 10, while operating the boom 40, in a longitudinal direction, in lateral direction, etc.). By way of example, the controller 410 may maintain the lift base 12, the turntable 14, and/or the boom 40 level relative to gravity.

The controller 410 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 30, the controller 410 includes a processing circuit 412 and a memory 414. The processing circuit 412 may include an ASIC, one or more FPGAs, a DSP, circuits containing one or more processing components, circuitry for supporting a microprocessor, a group of processing components, or other suitable electronic processing components. In some embodiments, the processing circuit 412 is configured to execute computer code stored in the memory 414 to facilitate the activities described herein. The memory 414 may be any volatile or non-volatile computer-readable storage medium capable of storing data or computer code relating to the activities described herein. According to an exemplary embodiment, the memory 414 includes computer code modules (e.g., executable code, object code, source code, script code, machine code, etc.) configured for execution by the processing circuit 412. In some embodiments, controller 410 represents a collection of processing devices (e.g., servers, data centers, etc.). In such cases, the processing circuit 412 represents the collective processors of the devices, and the memory 414 represents the collective storage devices of the devices.

In one embodiment, the user interface 440 includes a display and an operator input. The display may be configured to display a graphical user interface, an image, an icon, and/or still other information. In one embodiment, the display includes a graphical user interface configured to provide general information about the left device (e.g., vehicle speed, fuel level, warning lights, battery level, etc.). The graphical user interface may also be configured to display a current position of the leveling system 100, a current position of the boom 40, a current position of the turntable 14, an orientation of the lift base 12 (e.g., angle relative to a ground surface, etc.), stability characteristics of the lift base 12, and/or still other information relating to the lift device 10 and/or the leveling system 100.

The operator input may be used by an operator to provide commands to at least one of the turntable 14, the drive actuators 18, the brakes 46, the boom 40, and the actuator circuit 300. The operator input may include one or more buttons, knobs, touchscreens, switches, levers, joysticks, pedals, a steering wheel, or handles. The operator input may facilitate manual control of some or all aspects of the operation of the lift device 10. It should be understood that any type of display or input controls may be implemented with the systems and methods described herein.

According to an exemplary embodiment, the controller 410 is configured to receive steering data from the steering sensors 280, displacement data from the displacement sensors 402, roll data from the roll sensors 404, pitch data from the pitch sensors 406, and/or pressure data from the load sensors 408. The displacement sensors 402 may be positioned to acquire the displacement data regarding the front right leveling actuator 200, the front left leveling actuator 220, the rear right leveling actuator 240, and/or the rear left leveling actuator 260. The displacement data may be indicative of an amount of displacement and/or a position (e.g., extension, retraction, etc.) of the front right leveling actuator 200, the front left leveling actuator 220, the rear right leveling actuator 240, and/or the rear left leveling actuator 260 (e.g., relative to a neutral position, a nominal position, a minimum position, a maximum position, etc.). The roll sensors 404 may be positioned to acquire the roll data indicative of a roll angle of the lift base 12 (e.g., relative to a horizontal roll alignment, a zero roll angle, etc.). The pitch sensors 406 may be positioned to acquire the pitch data indicative of a pitch angle of the lift base 12 (e.g., relative to a horizontal pitch alignment, a zero pitch angle, etc.). The load sensors 408 may be positioned to acquire the pressure data regarding the bore side pressure and/or the rod side pressure within each of the front right leveling actuator 200, the front left leveling actuator 220, the rear right leveling actuator 240, and/or the rear left leveling actuator 260. The pressure data may be indicative of a loading experienced by each of the tractive elements 16. According to an exemplary embodiment, the controller 410 monitors the loading status, the leveling status, the ground following status, and/or the height of the lift base 12 of the lift device 10 using the displacement data, the roll data, the pitch data, and/or the pressure data.

Figure 31:
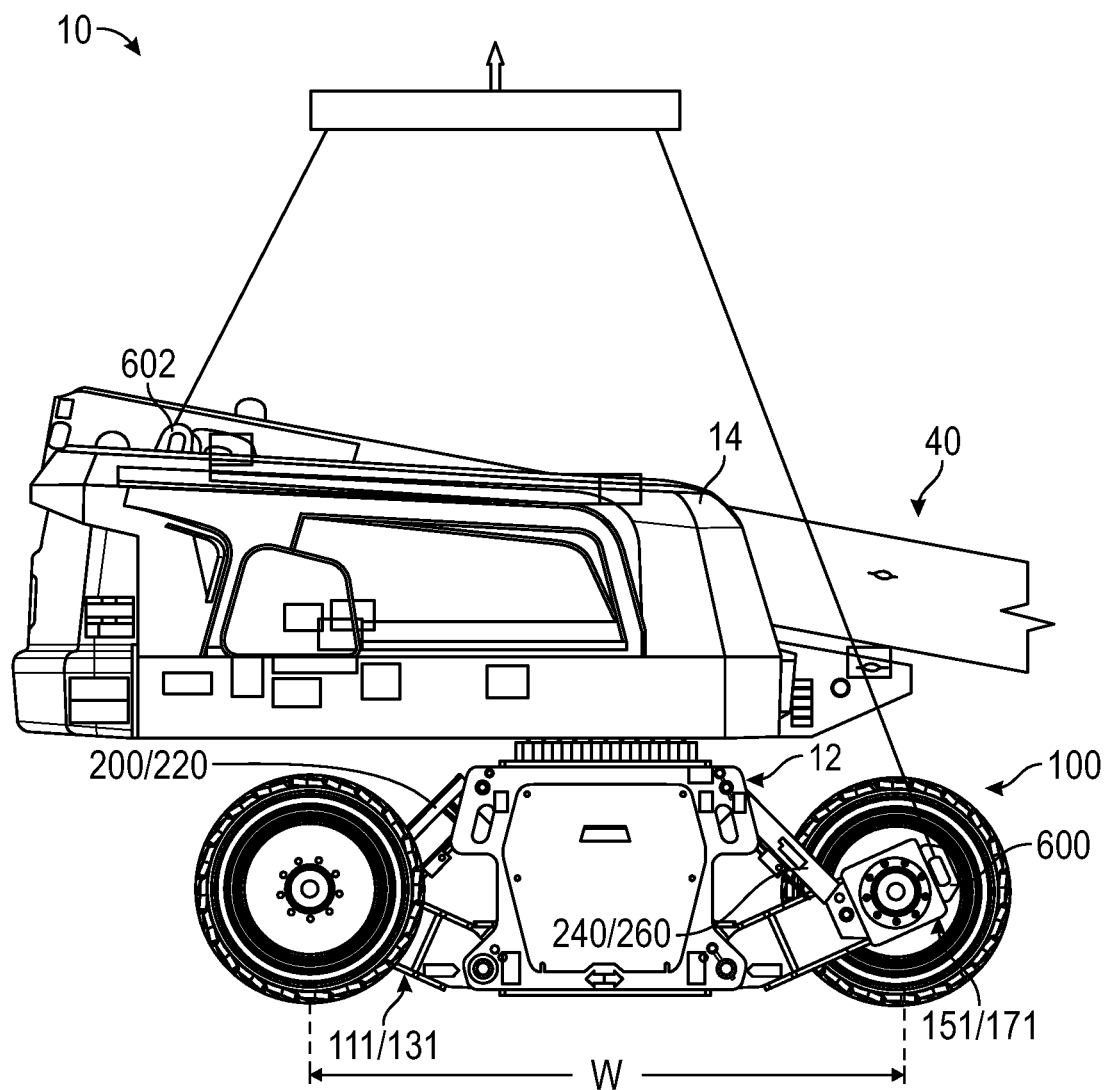
FIG. 31 is a side view of the lift device of FIG. 1 in a shipping, transport, or storage mode, according to an exemplary embodiment.

According to an exemplary embodiment, the controller 410 is configured to operate the leveling system 100 in various modes. As shown in FIG. 31, the lift device 10 is arranged in a shipping, transport, or storage mode. In some embodiments, the controller 410 is configured to reconfigure the lift device 10 into the shipping, transport, or storage mode in response to receiving a command from an operator via the user interface 440 to engage the shipping, transport, or storage mode. In some embodiments, the controller 410 is configured to reconfigure the lift device 10 into the shipping, transport, or storage mode in response to the lift device 10 being turned off. In some embodiments, the controller 410 is configured to reconfigure the lift device 10 out of the shipping, transport, or storage mode in response to the lift device 10 being turned on.

As shown in FIG. 31, the controller 410 is configured to retract the front right leveling actuator 200, the front left leveling actuator 220, the rear right leveling actuator 240, and the rear left leveling actuator 260 (e.g., to their minimum length, maximum retraction, etc.) such that (i) the front right trailing arm 111, the front left trailing arm 131, the rear right trailing arm 151, and the rear left trailing arm 171 rotate to move the lift base 12 downward to a minimum height (e.g., the minimum ground clearance h, etc.) and (ii) the front right trailing arm 111, the front left trailing arm 131, the rear right trailing arm 151, and the rear left trailing arm 171 extend away from the lift base 12 at upward sloping angle. According to an exemplary embodiment, the shipping, transport, or storage mode reconfigures the lift device 10 such that the lift device 10 provides greater clearance for bridges, wires, etc. while being transported (e.g., via a flatbed truck, etc.). Additionally, the shipping, transport, or storage mode eliminates the potential for the front right leveling actuator 200, the front left leveling actuator 220, the rear right leveling actuator 240, and/or the rear left leveling actuator 260 retracting during transport and, thereby, prevents shipping constraints (e.g., straps, etc.) from becoming slack and the lift device 10 becoming unsecure.

As shown in FIG. 31, the lift device 10 includes (i) first supports (e.g., lift support, eyelet, etc.), shown as supports 600, coupled to the rear right trailing arm 151 and the rear left trailing arm 171 (e.g., along the lateral members thereof, etc.) and (ii) second supports, shown as supports 602, coupled to the top of the turntable 14, proximate the rear end thereof, etc.). In some embodiments, the supports 600 are additionally or alternatively coupled to front right trailing arm 111 and the front left trailing arm 131 (e.g., along the lateral members thereof, etc.). As shown in FIG. 31, the supports 600 and the supports 602 are configured to facilitate lifting the lift device 10 (e.g., with a crane, etc.) while the lift device 10 is in the shipping, transport, or storage mode. According to an exemplary embodiment, the front right trailing arm 111, the front left trailing arm 131, the rear right trailing arm 151, the rear left trailing arm 171, the front right leveling actuator 200, the front left leveling actuator 220, the rear right leveling actuator 240, and the rear left leveling actuator 260 are designed to be load capable to facilitate such a lift operation of the lift device 10 while in the shipping, transport, or storage mode.

According to an exemplary embodiment, the lift device 10 has discrete release outputs for the brakes 46 of (i) the front right leveling assembly 110 and the front left leveling assembly 130 (i.e., the front brakes) and (ii) the rear right leveling assembly 150 and the rear left leveling assembly 170 (i.e., the rear brakes). In various situations, the controller 410 operates the brakes 46 in a discrete braking mode where the controller 410 may be configured to (i) release the front brakes and the rear brakes at different times or (ii) only release one of the front brakes or the rear brakes to prevent the tractive elements 16 from sliding or skidding during extension and retraction of (a) the leveling actuators and/or (b) the steering actuators.

By way of example, the controller 410 may be configured to release only one of the front brakes or the rear brakes when entering into or out of the shipping, transport, and/or storage mode. For example, entering into and out of the shipping, transport, and/or storage mode changes the wheel base w of the lift device 10 because the trailing arms pivot to an angle both above and below a horizontal. Specifically, the wheel base w of the lift device 10 is at a maximum when the trailing arms are completely horizontal and the wheel base w of the lift device 10 is less than the maximum when the trailing arms are pivoted above horizontal or below horizontal. Accordingly, the controller 410 may be configured to only release one of the front brakes or the rear brakes during the transition into or out of the shipping, transport, and/or storage mode to prevent (i) sliding of the tractive elements 16 if none of the brakes 46 were released or (ii) uncontrolled rolling of the lift device 10 if all of the brakes 46 were released simultaneously. Therefore, if the controller 410 only releases the front brakes, the front tractive elements 16 will roll forward as the wheel base w increases (e.g., as the trailing arms pivot from an angle below horizontal to horizontal, as the trailing arms pivot from an angle above horizontal to horizontal, etc.) and/or roll backward as the wheel base decreases (e.g., as the trailing arms pivot from horizontal to an angle above horizontal, as the trailing arms pivot from horizontal to an angle below horizontal, etc.). While explained in relation to releasing the front brakes, the same may be true for releasing the rear brakes instead of the front brakes.

By way of another example, the controller 410 may be configured to release only one of the front brakes or the rear brakes when the controller 410 receives a steer command, but no drive command. In such an instance, the controller 410 may be configured to release the front brakes to allow the front tractive elements to roll and be steered more freely, while maintaining the back brakes engaged to prevent any forward or backward movement of the lift device 10, especially if the lift device 10 is on a slope. While again explained in relation to releasing the front brakes, the same may be true for releasing the rear brakes instead of the front brakes.

According to an exemplary embodiment, the controller 410 is configured to operate the lift device 10 in an adaptive oscillation mode where the controller 410 is configured to selectively and adaptively reconfigure the leveling system 100 between the rear float configuration 102, the front float configuration 104, the left float configuration 106, and the right float configuration 108. By way of example, the controller 410 may be configured to adaptively switch between the rear float configuration 102, the front float configuration 104, the left float configuration 106, and the right float configuration 108 based on a current center of gravity 506 of the lift device 10 (see, e.g., FIGS. 26-29) to maintain optimal stability for the lift device 10 (e.g., the controller 410 may change between pairs of fluidly coupled leveling actuators in real time as is appropriate due to movement of the center of gravity 506, etc.). The center of gravity 506 may be determined based on the pressure data acquired by the load sensors 408. By way of example, the controller 410 is configured to interpret the pressure data for each of the front right leveling actuator 200, the front left leveling actuator 220, the rear right leveling actuator 240, and the rear left leveling actuator 260. Based on the pressure data, the controller 410 is configured to determine the load on each of the tractive elements 16 to determine which two of the tractive elements 16 are experiencing a "heavier" loading and which two of the tractive elements 16 are experiencing a "lighter" loading. In other embodiments, the center of gravity 506 is not determined. Rather, the knowledge of the position of the components of the lift device 10 (e.g., the boom 40, the turntable 14, etc.) and/or force measurements on the tractive elements 16 are used to determine which pair of actuators are appropriate to float.

The controller 410 is then configured to enter the two leveling assemblies (e.g., of the front right leveling assembly 110, the front left leveling assembly 130, the rear right leveling assembly 150, the rear left leveling assembly 170, etc.) associated with the two tractive elements 16 that have the lighter loading into a float mode and enter the other two leveling assemblies associated with the other two tractive elements 16 that have a heavier loading into an active mode. Accordingly, the controller 410 is configured to engage the two float modules (e.g., of the front right float module 312, the front left float module 332, the rear right float module 352, the rear left float module 372, etc.) associated with the two tractive elements 16 that have the lighter loading to fluidly couple the two leveling actuators thereof (e.g., of the front right leveling actuator 200, the front left leveling actuator 220, the rear right leveling actuator 240, the rear left leveling actuator 260, etc.) together such that they freely float. The controller 410 is configured to monitor the loading such that as the loads on the tractive elements 16 change (e.g., as the boom 40, the turntable 14, etc. are manipulated), the controller 410 shifts which two float modules are engaged, and which two float modules are disengaged. In some embodiments, only adjacent actuators are fluidly coupled together (see, e.g., FIGS. 26-29).

While adaptively controlling which two float modules are engaged and which two float modules are disengaged, the controller 410 is configured to maintain the lift base 12 level or substantially level relative to gravity by (i) actively controlling the two leveling actuators associated with the non-engaged float modules with the leveling modules associated therewith (e.g., the front right leveling module 310, the front left leveling module 330, the rear right leveling module 350, the rear left leveling module 370, etc.) and (ii) actively controlling the height of the virtual pivot point 502 between the two fluidly coupled leveling assemblies (e.g., via the extend and retract float controls associated with the two fluidly coupled leveling actuators, etc.) based on the displacement data, the pitch data, and/or the roll data.

In some embodiments, the controller 410 is configured to control the float valves (e.g., the front right float valve 314, the front left float valve 334, the rear right float valve 354, the rear left float valve 374, etc.) and the leveling modules (e.g., the front right leveling module 310, the front left leveling module 330, the rear right leveling module 350, the rear left leveling module 370, etc.) of the fluidly coupled leveling actuators such that fluid flows in a desired direction (i.e., one direction at a time) between a heavier loaded leveling actuator to a lighter loaded leveling actuator of the two fluidly coupled leveling actuators. By way of example, if the front right leveling actuator 200 and the front left leveling actuator 220 are fluidly coupled and "freely floating" (i.e., the front tractive elements 16 are lighter than the rear tractive elements 16), and the pressure in the front right leveling actuator 200 is greater than the pressure in the front left leveling actuator 220, (i) the front right float valve 314 and the front left float valve 334 may be engaged (i.e., to enter the front right leveling assembly 110 and the front left leveling assembly 130 into the float mode) and (ii) the front right leveling module 310 and the front left leveling module 330 may be controlled such that fluid can only flow out of the front right leveling actuator 200 and into the front left leveling actuator 220.

According to an exemplary embodiment, the controller 410 is configured to operate the lift device 10 in an auto level mode (e.g., while driving, etc.) that keeps the lift device 10 level or substantially level relative to gravity while maintaining the leveling actuators (e.g., the front right leveling actuator 200, the front left leveling actuator 220, the rear right leveling actuator 240, the rear left leveling actuator 260, etc.) at a position of extension or retraction that is away from the endpoints thereof (e.g., maximum extension, maximum retraction, etc.). By way of example, extended operation of the lift device 10 in the auto level mode could cause the lift base 12 to "walk up" or "walk down" since there are potentially many possible solutions to provide a level lift base 12 (e.g., the height of the leveling actuators may all be able to be reduced in half and still provide a level chassis, etc.). In some embodiments, the controller 410 is configured to maintain the leveling actuators at or close to the midpoint of the leveling actuators while simultaneously keeping the lift device 10 level relative to gravity during the auto level mode. In some embodiments, the controller 410 is configured to cutout drive system commands in response to a sudden change in ground profile until a level condition is reestablished. In some embodiments, the controller 410 is configured to switch from the auto level mode to a high-speed drive mode in response to a command requesting the lift device 10 to driven at a speed above a threshold speed. The auto level mode and the high-speed drive mode are described in greater detail herein with respect to methods 700, 800, and 900.

Figure 32:
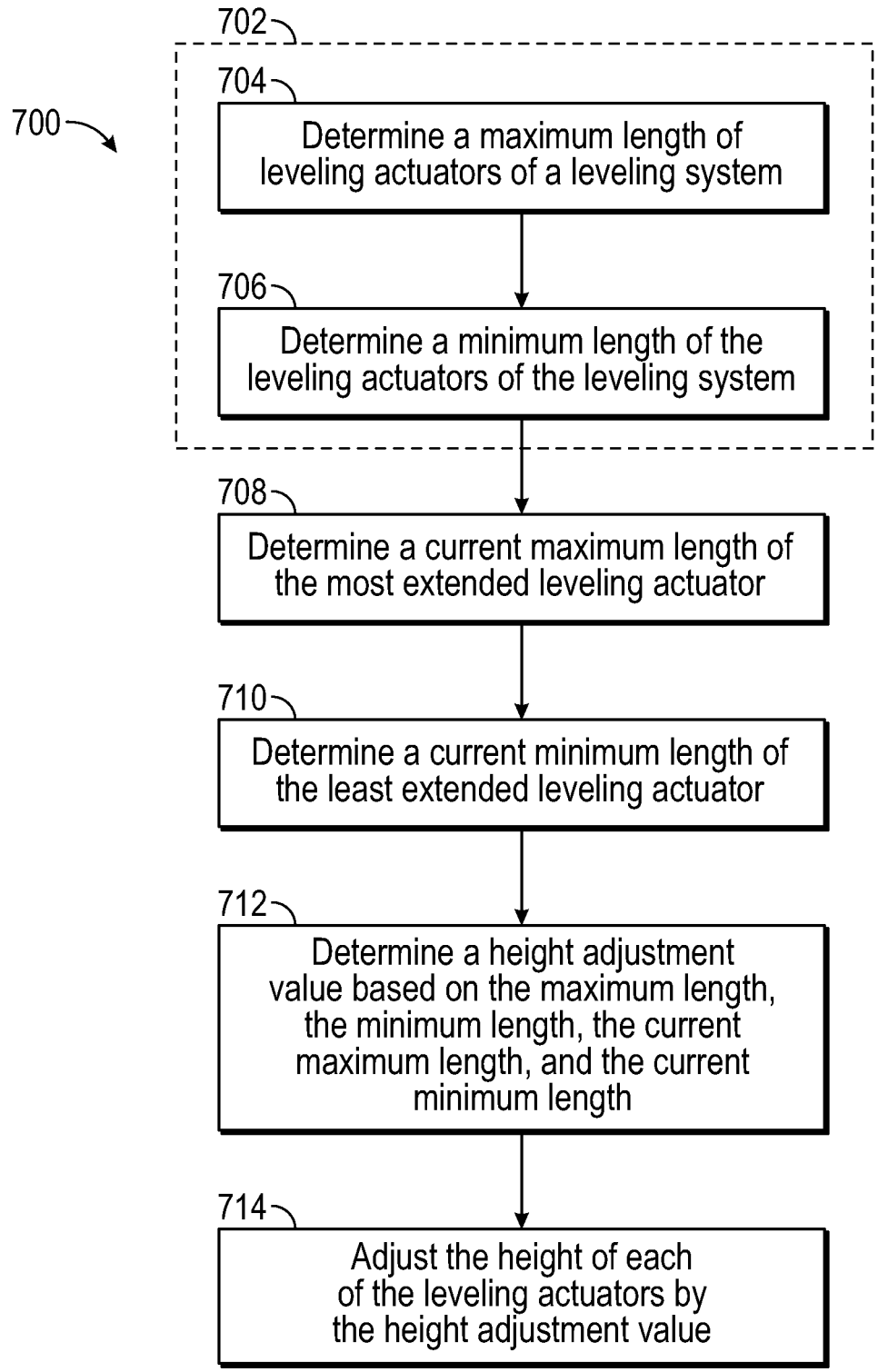
FIG. 32 is a block diagram of a method for centering chassis height during an auto level mode, according to an exemplary embodiment.

Referring now to FIG. 32, a method 700 for centering chassis height of the lift device 10 during an auto level mode is shown, according to an exemplary embodiment. At step 702, the controller 410 is configured to implement a calibration procedure. The calibration procedure includes (i) determining a maximum length or stroke of the leveling actuators of the leveling system 100 (e.g., by extending the front right leveling actuator 200, the front left leveling actuator 220, the rear right leveling actuator 240, and the rear left leveling actuator 260 to a maximum extension position, etc.) (step 704) and (ii) determining a minimum length or stroke of the leveling actuators of the leveling system 100 (e.g., by retracting the front right leveling actuator 200, the front left leveling actuator 220, the rear right leveling actuator 240, and the rear left leveling actuator 260 to a minimum extension position, etc.) (step 706). The controller 410 may be configured to determine the maximum length and the minimum length based on displacement data acquired by the displacement sensors 402. The controller 410 may perform the calibration procedure at startup, periodically, and/or when commanded to perform the calibration procedure.

At step 708, the controller 410 is configured to determine a current maximum length of the most extended leveling actuator of the front right leveling actuator 200, the front left leveling actuator 220, the rear right leveling actuator 240, and the rear left leveling actuator 260. At step 710, the controller 410 is configured to determine a current minimum length of the least extended leveling actuator of the front right leveling actuator 200, the front left leveling actuator 220, the rear right leveling actuator 240, and the rear left leveling actuator 260. The controller 410 may be configured to determine the current maximum length and the current minimum length based on displacement data acquired by the displacement sensors 402.

At step 712, the controller 410 is configured to determine a height adjustment value based on the maximum length, the minimum length, the current maximum length, and the current minimum length. According to an exemplary embodiment, the controller 410 is configured to determine the height adjustment value using the following expression:

$$\Delta h = \frac{((h_{max} - h_{min}) - h_{max_{current}}) - (h_{min_{current}} - 0)}{2} \quad (1)$$

where $\Delta h$ is the height adjustment value, $h_{max}$ is the maximum length, $h_{min}$ is the minimum length, $h_{max_{current}}$ is the current maximum length of the most extended leveling actuator, and $h_{min_{current}}$ is the current minimum length of the least extended leveling actuator.

At step 714, the controller 410 is configured to adjust the current height of each of the front right leveling actuator 200, the front left leveling actuator 220, the rear right leveling actuator 240, and the rear left leveling actuator 260 by the height adjustment value. According to an exemplary embodiment, method 700 facilitates preventing "walk up" or "walk down" of the lift base 12 over time by actively driving the leveling actuators toward a position that is away from maximum lengths and minimum lengths thereof and toward the mid-points thereof, while maintaining the lift base 12 level or substantially level.

Figure 33:
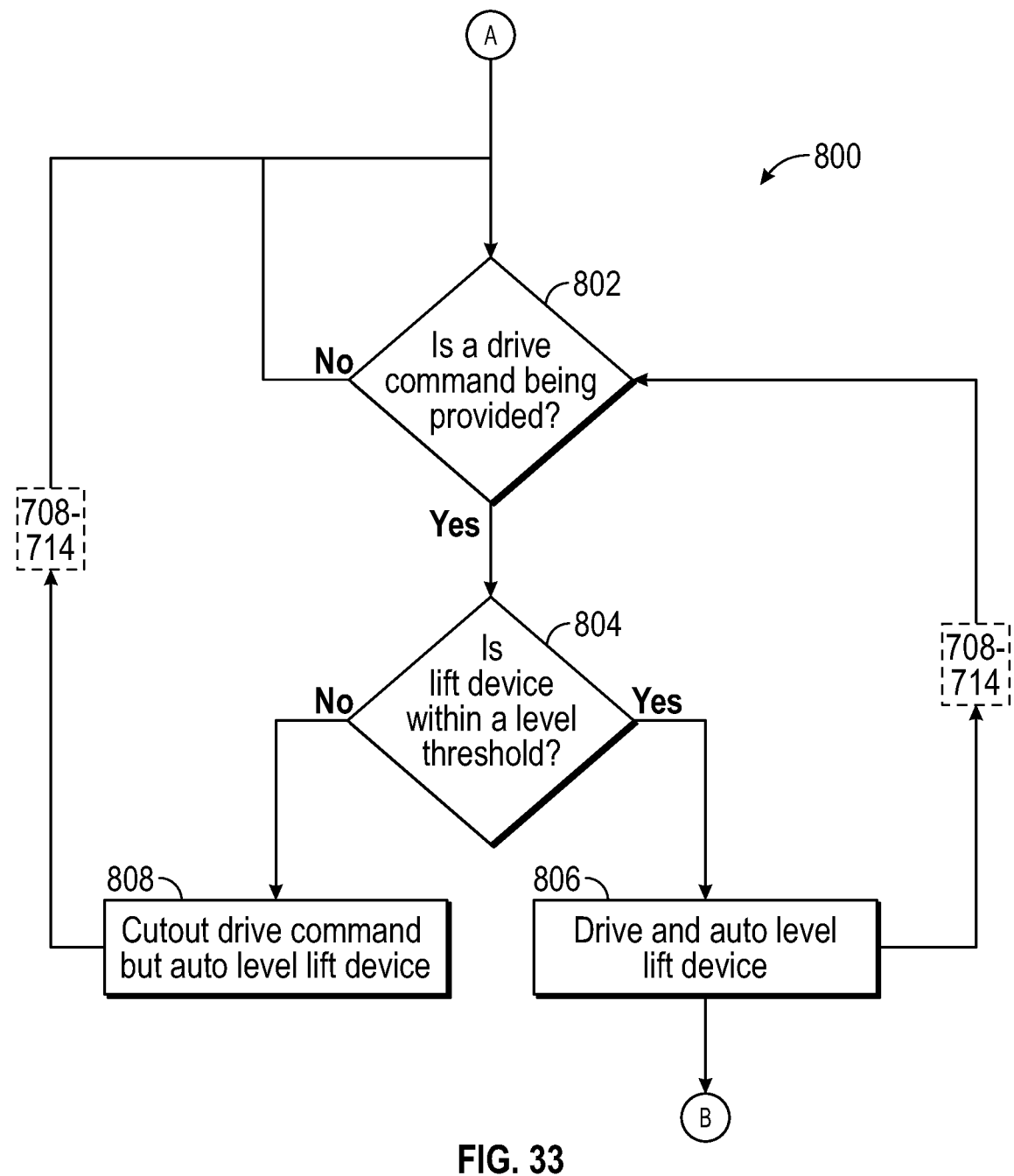
FIG. 33 is a block diagram of a method for initiating a drive command cutout during the auto level mode, according to an exemplary embodiment.

Referring now to FIG. 33, a method 800 for initiating a drive command cutout during the auto level mode is shown, according to an exemplary embodiment. At step 802, the controller 410 is configured to determine whether a drive command is being provided thereto (e.g., via an operator using the user interface 440, etc.). If no drive command is being provided, the controller 410 is configured to wait for such drive command before proceeding. In some embodiments, the controller 410 may initiate the adaptive oscillation mode and/or the shipping, transport, or storage mode when a drive command is not being provided (e.g., after a designated period of time, etc.). When a drive command is provided, at step 804, the controller 410 is configured to determine whether the lift device 10 is currently within a level threshold (e.g., not leaning more than 10 degrees in any direction, etc.). If yes, the controller 410 is configured to proceed to step 806, otherwise the controller 410 is configured to proceed to step 808.

At step 806, the controller 410 is configured to drive the lift device 10 based on the drive command (e.g., engage the drive actuators 18, etc.) and auto level the lift device 10 as the lift device 10 is driven (e.g., actively and independently control each of the front right leveling actuator 200, the front left leveling actuator 220, the rear right leveling actuator 240, and the rear left leveling actuator 260 to maintain the lift device 10 level or substantially level to gravity, etc.). During the auto leveling, the controller 410 may be configured to implement steps 708-714 of method 700.

At step 808, the controller 410 is configured to cutout (i.e., disregard) the drive command, but auto level the lift device 10. During the auto leveling, the controller 410 may be configured to implement steps 708-714 of method 700. Step 808 may be implemented by the controller 410 in scenarios where the lift device 10 encounters an abrupt change in the ground profile and the auto leveling cannot keep up and maintain the lift device 10 within the level threshold. Once the auto leveling corrects for the abrupt change, the controller 410 may reinstitute the drive command.

Figure 34:
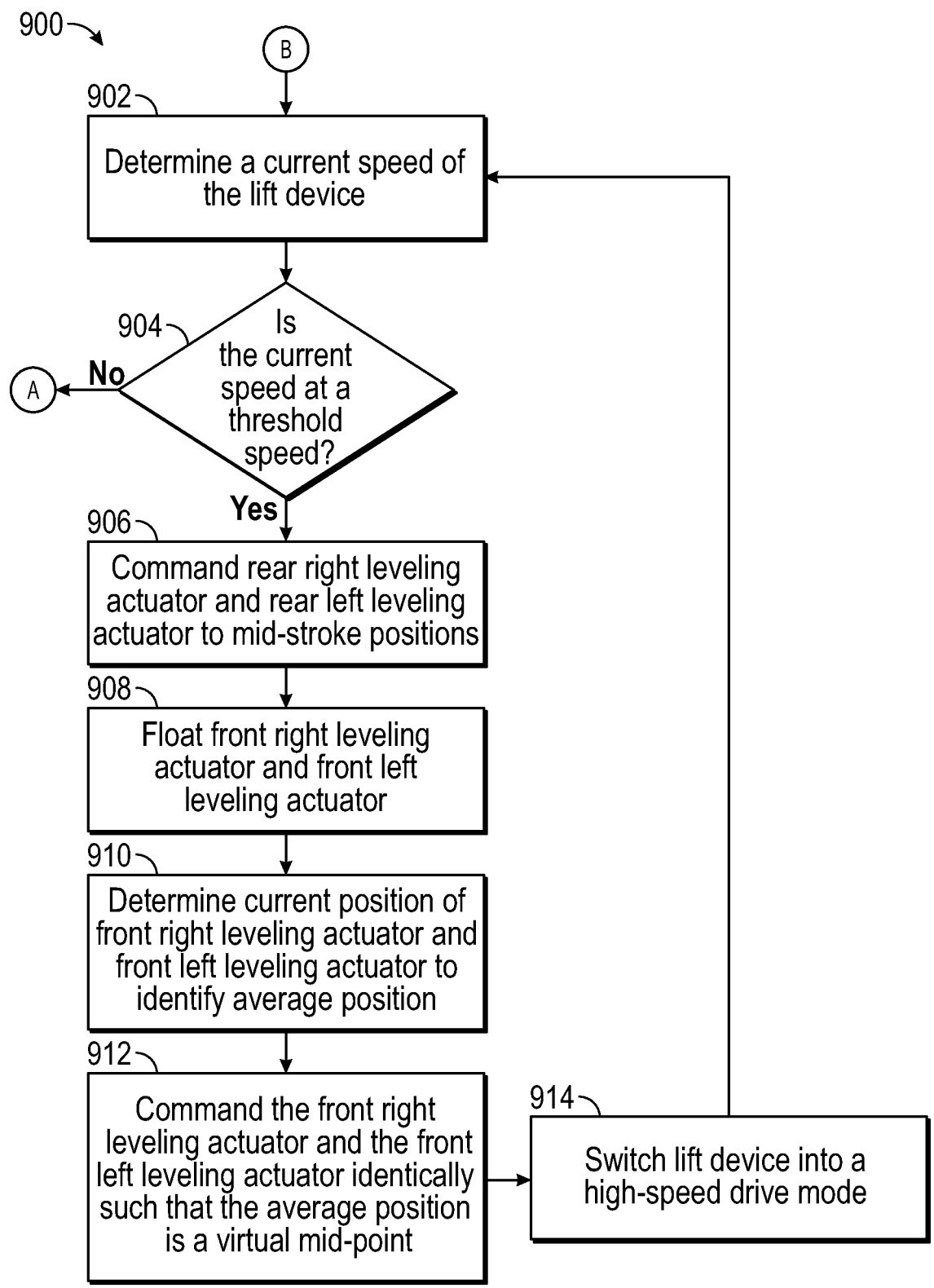
FIG. 34 is a block diagram of a method for switching from the auto level mode to a high-speed drive mode, according to an exemplary embodiment.

Referring now to FIG. 34, a method 900 for switching from the auto level mode to a high-speed drive mode is shown, according to an exemplary embodiment. At step 902, the controller 410 is configured to determine a current speed of the lift device 10. At step 904, the controller 410 is configured to determine whether the current speed is at a speed threshold (e.g., a high speed, etc.). If the current speed is below the speed threshold, the controller 410 is configured to perform the auto level mode (see, e.g., methods 700 and 800). If the current speed is at or above the speed threshold, the controller 410 is configured to switch from the auto level mode to the high-speed drive mode.

At step 906, the controller 410 is configured to provide a command to the rear right leveling actuator 240 and the rear left leveling actuator 260 to reposition them to or near their mid-stroke positions. At step 908, the controller 410 is configured to float the front right leveling actuator 200 and the front left leveling actuator 220 (see, e.g., FIG. 27). At step 910, the controller 410 is configured to determine a current position of the front right leveling actuator 200 and the front left leveling actuator 220 to identify an average position of the two (e.g., the virtual pivot point 502, etc.).

The controller 410 may be configured to determine the average position based on displacement data acquired by the displacement sensors 402.

At step 912, the controller 410 is configured to provide an identical command to the front right leveling actuator 200 and the front left leveling actuator 220 such that the average position (e.g., the virtual pivot point 502, etc.) is a virtual mid-point of the front right leveling assembly 110 and the front left leveling assembly 130 (e.g., the virtual pivot point 502 is at a mid-point between a maximum possible height of the virtual pivot point 502 and a minimum possible point of the virtual pivot point 502, etc.). At step 914, the controller 410 is configured to switch the lift device 10 into the high-speed drive mode from the auto level mode and allow the speed of the lift device 10 to increase above the threshold speed.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

The hardware and data processing components used to implement the various processes, operations, illustrative logics, logical blocks, modules and circuits described in connection with the embodiments disclosed herein may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the lift device 10, the leveling system 100, the actuator circuit 300, and the lift device control system 400 as shown in the various exemplary embodiments is illustrative only. Additionally, any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

The invention claimed is:

1. A chassis for a lift device, the chassis comprising:
a base defining an arm interface;
an arm pivotably coupled to the arm interface of the base and configured to support a tractive element, the arm including a steering actuator interface configured to support an end of a steering actuator for the tractive element; and
a plate extending from the arm at an upward angle, the plate configured to be positioned beneath and extend past the steering actuator;
wherein the arm has a longitudinal portion coupled to the base and a lateral portion extending from the longitudinal portion that supports the tractive element and from which the plate extends;
wherein the lateral portion of the arm has a first surface facing the base and a second surface facing away from the base;
wherein the steering actuator interface is positioned along the second surface;
wherein the base defines a first pivot actuator interface and the arm defines a second pivot actuator interface positioned along the first surface; and
wherein the first pivot actuator interface of the base and the second pivot actuator interface of the lateral portion are configured to support ends of a pivot actuator.

2. The chassis of claim 1, further comprising the tractive element and the steering actuator.

3. The chassis of claim 1, wherein the lateral portion extends perpendicularly from the longitudinal portion.

4. The chassis of claim 1, wherein the lateral portion extends at an obtuse angle from the longitudinal portion.

5. The chassis of claim 1, further comprising:
the pivot actuator; and
a pressure sensor assembly including:
a first mount positioned along the pivot actuator;
a second mount positioned along the pivot actuator and spaced from the first mount; and
a cover extending along the pivot actuator and coupled to the first mount and the second mount;
wherein at least one of the first mount or the second mount is configured to facilitate coupling a pressure sensor to the pivot actuator.

6. The chassis of claim 1, wherein the arm is a first arm, further comprising a second arm coupled to a side of the base opposite the first arm, wherein the first arm and the second arm have a different shape or structure.

7. The chassis of claim 1, wherein at least one of:
a portion of a bottom surface of the arm is angled; or
the plate is continuous with the portion of the bottom surface that is angled.

8. A chassis for a lift device, the chassis comprising:
a base;
an arm coupled to the base and configured to support a tractive element, the arm including a steering actuator interface configured to support an end of a steering actuator for the tractive element; and
a plate extending from the arm at an upward angle, the plate configured to extend past the steering actuator;
wherein a portion of a bottom surface of the arm is angled; and
wherein the plate is continuous with the portion of the bottom surface that is angled.

9. A chassis for a lift device, the chassis comprising:
a base (i) defining an interior chamber and an aperture that facilitates passing at least one of hosing or wiring through a wall of the base into the interior chamber and (ii) [[has]] having a tab positioned proximate the aperture and that extends from the wall, wherein the tab facilitates securing the at least one of the hosing or the wiring thereto using a retainer;
an arm coupled to the base and configured to support a tractive element, the arm including a steering actuator interface configured to support an end of a steering actuator for the tractive element; and
a plate extending from the arm at an upward angle, the plate configured to extend past the steering actuator.

10. The chassis of claim 9, wherein the tab defines notches at opposing ends thereof that at least partially prevent the retainer from sliding off of the tab.

11. A chassis for a lift device, the chassis comprising:
a base (i) defining an arm interface, an interior chamber, and an aperture that facilitates passing at least one of hosing or wiring through a wall of the base into the interior chamber and (ii) having a tab positioned proximate the aperture and that extends from the wall, and wherein the tab facilitates securing the at least one of the hosing or the wiring thereto using a retainer;
an arm pivotably coupled to the arm interface of the base and configured to support a tractive element, the arm including a steering actuator interface configured to support an end of a steering actuator for the tractive element; and
a plate extending from the arm, the plate configured to be positioned beneath and extend past the steering actuator.

12. The chassis of claim 11, wherein the arm has a first portion coupled to the base and a second portion extending from the first portion that supports the tractive element and from which the plate extends.

13. The chassis of claim 11, wherein a portion of a bottom surface of the arm is angled.

14. A chassis for a lift device, the chassis comprising:
a base defining an arm interface;
an arm pivotably coupled to the arm interface of the base and configured to support a tractive element, the arm including a steering actuator interface configured to support an end of a steering actuator for the tractive element; and
a plate extending from the arm, the plate configured to be positioned beneath and extend past the steering actuator;
wherein the arm has a first portion coupled to the base and a second portion extending from the first portion that supports the tractive element and from which the plate extends;

wherein the second portion of the arm has a first surface facing the base and a second surface facing away from the base;

wherein the steering actuator interface is positioned along the second surface;

wherein the base defines a first pivot actuator interface and the arm defines a second pivot actuator interface positioned along the first surface; and wherein the first pivot actuator interface of the base and the second pivot actuator interface of the second portion are configured to support ends of a pivot actuator.

15. A chassis for a lift device, the chassis comprising:

a base defining an arm interface;

an arm pivotably coupled to the arm interface of the base and configured to support a tractive element, the arm including a steering actuator interface configured to support an end of a steering actuator for the tractive element; and a plate extending from the arm, the plate configured to be positioned beneath and extend past the steering actuator;

wherein a portion of a bottom surface of the arm is angled; and wherein the plate is continuous with the portion of the bottom surface that is angled.

* * * * *